US012661624B2

(12) United States Patent
Brewer et al.

(10) Patent No.: US 12,661,624 B2
(45) Date of Patent: Jun. 23, 2026

(54) SOLAR CONCENTRATOR REACTOR FOR HIGH TEMPERATURE THERMOCHEMICAL PROCESSES

(71) Applicant: Blueshift, LLC, Broomfield, CO (US)

(72) Inventors: Andrew Timon Brewer, Wheat Ridge, CO (US); Ryan Garvey, Lafayette, CO (US)

(73) Assignee: Blueshift, LLC, Broomfield, CO (US)

( * ) Notice: Subject to any disclaimer, the term of this patent is extended or adjusted under 35 U.S.C. 154(b) by 903 days.

(21) Appl. No.: 17/668,206

(22) Filed: Feb. 9, 2022

(65) Prior Publication Data

US 2022/0274077 A1     Sep. 1, 2022

Related U.S. Application Data

(60) Provisional application No. 63/153,571, filed on Feb. 25, 2021.

(51) Int. Cl.
B01J 6/00          (2006.01)
B01J 19/12          (2006.01)
(Continued)

(52) U.S. Cl.
CPC ............. B01J 6/008 (2013.01); B01J 19/127 (2013.01); C01B 5/00 (2013.01); C01B 13/0203 (2013.01);
(Continued)

(58) Field of Classification Search
CPC .......... B01J 6/008; C01B 32/50; C01B 32/40; F24S 20/20
See application file for complete search history.

(56) References Cited

U.S. PATENT DOCUMENTS

| | | | |
|---|---|---|---|
| 4,948,477 | A | 8/1990 | Gibson |
| 5,536,378 | A | 7/1996 | Gibson |

(Continued)

FOREIGN PATENT DOCUMENTS

| | | |
|---|---|---|
| AU | 2010 258 857 B2 | 10/2015 |
| WO | WO 2011/116141 | 9/2011 |

OTHER PUBLICATIONS

International Search Report and Written Opinion mailed May 12, 2022 in PCT/US2022/015901.
Demonstrating the solar carbothermal reduction of lunar regolith to produce oxygen, Gustafson, 48th AIAA Aerospace Sciences Meeting, Jan. 4, 2010.
Search Report and Examination Report issued by UAE Patent Office in UAE P6002101/2023 received on Jan. 22, 2025.
(Continued)

*Primary Examiner* — Claire X Wang
*Assistant Examiner* — Alyssa Lee Kuykendall
(74) *Attorney, Agent, or Firm* — Critical Path IP Law, LLC

(57) ABSTRACT

A solar concentrator reactor system and method of use for high temperature thermochemical processes. In one embodiment, the solar concentrator reactor system produces a thermochemical reaction of irradiated particles within an enclosed vessel volume of a solar concentrator reactor. In one aspect, the solar concentrator reactor system uses a solar concentrator to irradiate particles of a particle stream within an enclosed vessel volume of a solar concentrator reactor. The thermochemical reaction yields a chemical change of the feedstock and/or phase transition of the feedstock such as the production of a molten reacted material from a solid particulate feed. In one embodiment, the particles are a lunar regolith and the thermochemical reaction yields oxygen.

20 Claims, 8 Drawing Sheets

(51) Int. Cl.

| | |
|---|---|
| *C01B 5/00* | (2006.01) |
| *C01B 13/02* | (2006.01) |
| *C01B 32/40* | (2017.01) |
| *C01B 32/50* | (2017.01) |
| *F24S 20/20* | (2018.01) |

(52) U.S. Cl.

CPC .............. *C01B 32/40* (2017.08); *C01B 32/50* (2017.08); *F24S 20/20* (2018.05); *B01J 2219/0801* (2013.01); *B01J 2219/0879* (2013.01); *B01J 2219/1203* (2013.01)

(56) References Cited

U.S. PATENT DOCUMENTS

| | | | | |
|---|---|---|---|---|
| 7,723,654 | B2 | 5/2010 | Taylor | |
| 9,150,802 | B2 | 10/2015 | Perkins | |
| 10,508,834 | B1 | 12/2019 | Ho | |
| 2008/0086946 | A1 | 4/2008 | Weimer | |
| 2008/0173533 | A1 | 7/2008 | Mankins | |
| 2008/0314411 | A1 | 12/2008 | Mueller | |
| 2011/0193026 | A1 | 8/2011 | Weimer | |
| 2011/0315539 | A1 | 12/2011 | Zadik | |
| 2013/0145761 | A1 | 6/2013 | McAlister | |
| 2015/0090251 | A1 | 4/2015 | Magaldi | |
| 2015/0110683 | A1* | 4/2015 | McAlister | ................. C12P 3/00 422/184.1 |
| 2016/0045841 | A1 | 2/2016 | Kaplan | |
| 2018/0339283 | A1 | 11/2018 | Wegeng | |
| 2019/0263699 | A1 | 8/2019 | Finger | |
| 2019/0316812 | A1 | 10/2019 | Ho | |
| 2019/0326852 | A1* | 10/2019 | Ho | ........................ F24S 20/20 |
| 2019/0346177 | A1 | 11/2019 | Jafarian | |
| 2020/0191443 | A1 | 6/2020 | Garvey | |

OTHER PUBLICATIONS

Extended European Search Report mailed Oct. 28, 2024 in EP 22760202.6.

Bruckner, et al "Continuous Duty Solar Coal Gasification System Using Molten Slag and Direct-Contact Heat Exchange," Solar Energy, vol. 34, No. 3, Jan. 1, 1985.

Isachenkov, et al "Regolith-Based Additive Manufacturing for Sustainable Development of Lunar Infrastructure," ACTA Astronautica, vol. 180, Jan. 8, 2021.

Extended European Search Report mailed Oct. 28, 2024 in EP 22760258.8.

International Search Report and Written Opinion mailed Aug. 10, 2022 in PCT/US2022/017217.

"Design of a pilot scale directly irradiated,high temperature,and low pressure moving particle cavity chamber for metal oxide reduction," Singh et al,Solar Energy, Nov. 15, 2017.

Substantive Examination Report in Saudi Arabia Application No. 523450349, Saudi Authority for Intellectual Property, Jun. 29, 2025.

"Performance analysis of a lunar based solar thermal power system with regolith thermal storage," Lu, X. et al, Energy 107 (2016) pp. 227-233.

USPTO Office Action in U.S. Appl. No. 17/676,919 mailed Oct. 24, 2025.

USPTO Notice of Allowance in U.S. Appl. No. 17/676,919 mailed Dec. 23, 2025.

USPTO Corrected Notice of Allowability in U.S. Appl. No. 17/676,919 mailed Jan. 7, 2026.

IP Australia First Examination Report in AU Appl No. 2022 226599 dated Mar. 3, 2026.

\* cited by examiner

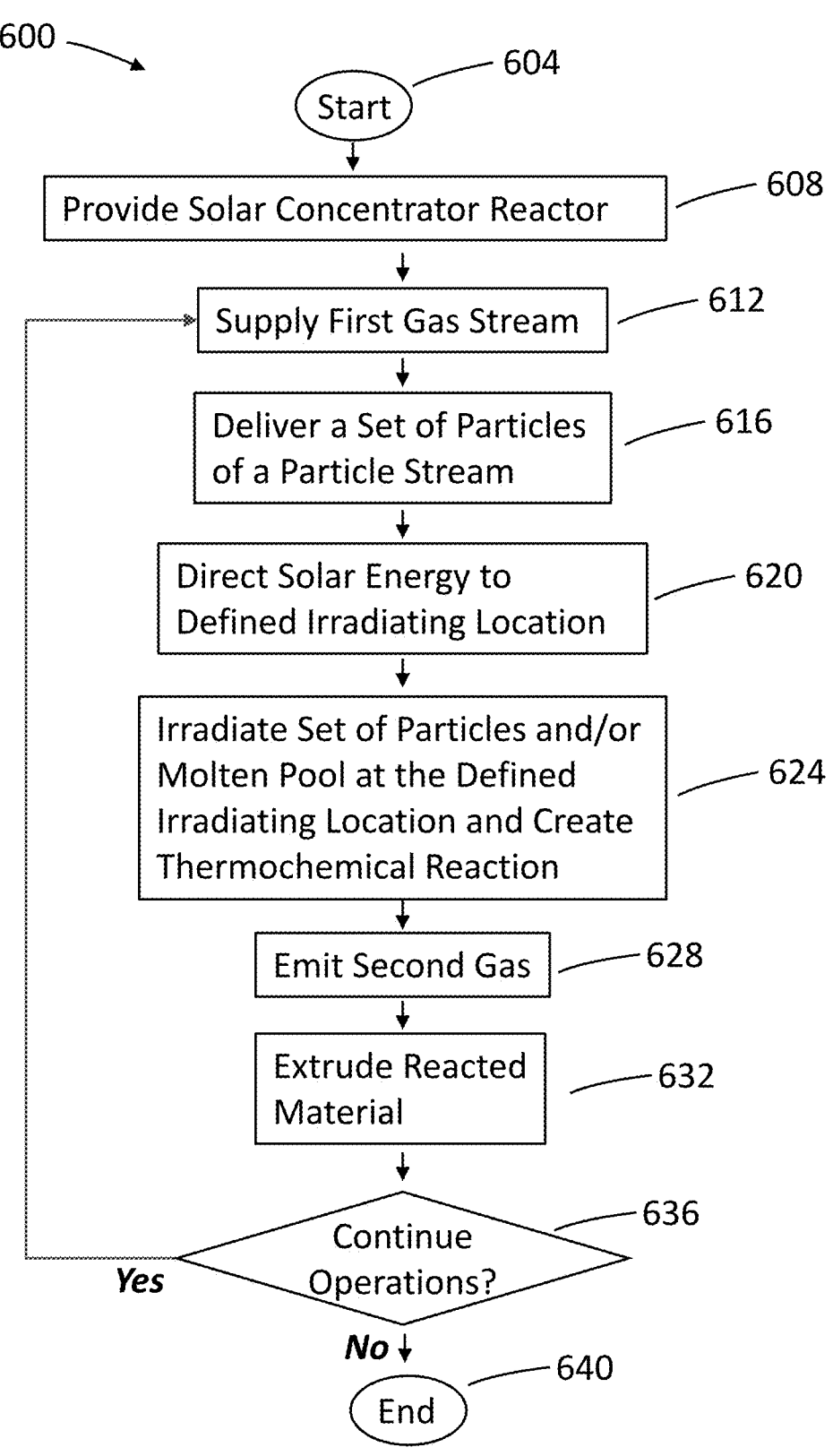

600

Start — 604

Provide Solar Concentrator Reactor — 608

Supply First Gas Stream — 612

Deliver a Set of Particles of a Particle Stream — 616

Direct Solar Energy to Defined Irradiating Location — 620

Irradiate Set of Particles and/or Molten Pool at the Defined Irradiating Location and Create Thermochemical Reaction — 624

Emit Second Gas — 628

Extrude Reacted Material — 632

Continue Operations? — 636

Yes

No

End — 640

Fig. 6

SOLAR CONCENTRATOR REACTOR FOR HIGH TEMPERATURE THERMOCHEMICAL PROCESSES

CROSS-REFERENCE TO RELATED APPLICATION

This application is a nonprovisional patent application of and claims the benefit of U.S. Provisional Patent Application No. 63/153,571 filed Feb. 25, 2021 and titled "Solar Concentrator Reactor for High Temperature Thermochemical Processes," the disclosure of which is incorporated herein by reference in entirety.

STATEMENT

This invention was made with Government support under Contract No. 8ONSSC20C0600 awarded by the National Aeronautics and Space Administration (NASA). The Government has certain rights in the invention.

FIELD

The disclosure relates generally to a solar concentrator reactor system and method of use for high temperature thermochemical processes, in particular to a solar concentrator reactor system and method of use to produce a thermochemical reaction of irradiated particles enabled by a solar concentrator reactor.

BACKGROUND

Oxygen extraction from lunar and Martian regolith has been a topic of interest to NASA for over five decades for the disruptive benefits that In Situ Resource Utilization (ISRU) will have on space exploration and infrastructure development costs and logistics. Several methods for $O_2$ generation have been explored with laboratory-scale proofs of concept over those years as NASA's priorities evolved and shifted away from and back to the Moon. In 2005, NASA initiated the ISRU Project in the Exploration Technology and Development Program (ETDP) in order to promote and facilitate ISRU technology development across the board of potential applications and required subsystems. ETDP was cancelled and the ISRU Project was re-established through the Exploration Space Mission Directorate.

For oxygen extraction, the ISRU Project decided on three extraction methods to be developed over the five-year program ranging from low risk/low performance to high risk/high performance. Hydrogen reduction was selected as a low risk/low performance technology and brought to a Technology Readiness Level (TRL) 5 as a well-known, multi-step process that does not require molten regolith ($\ll 1,600°$ C.) but only works on iron oxide rich regolith. Carbothermal reduction was selected as a medium risk/medium performance technology and brought to a TRL 5 as a well-known, multi-step process requiring a reactant gas (methane) and molten regolith handling. Molten oxide electrolysis was selected as a high risk, high performance technology and brought to a TRL 3 as a single step process capable of producing multiple pure metals and non-metals in addition to oxygen but requiring significant advancements for handling molten metals and pure oxygen at high temperatures. Vapor phase pyrolysis was not included in NASA's development focus, likely due to its high temperature and energy requirements (2,000°-6,000° C.) but has also been explored in depth and holds great potential if coupled with the right thermal delivery system. The term "regolith" means any blanket of unconsolidated, loose, heterogeneous superficial deposits that covers solid rock, and may include soil, dust, broken rocks, and other related materials. Regolith is present at least on Earth, the Moon, Mars, and some asteroids.

The described solar concentrator reactor system, also referred to as the Solar Concentrating Oxygen Reactor for Continuous Heating and Extrusion of Regolith ("SCORCHER") system, addresses if not solves many challenges and/or problems of oxygen extraction of existing, conventional systems. SCORCHER is designed to work with multiple extraction processes, although it likely has the greatest impact on carbothermal reduction and vapor phase pyrolysis due to the very high temperatures that may be produced using concentrated solar energy. Coupled with the SCORCHER system to accommodate its significant energy requirements, vapor phase pyrolysis has the potential to surpass carbothermal reduction as a medium risk/medium-high performance technology due to its single-step simplicity and the potential for extracting multiple materials in addition to oxygen.

The disclosed invention has additional application for powering terrestrial high temperature thermochemical processes using concentrated solar energy. These applications include the production of biochar and biofuels from agricultural waste; iron ore refining; remediation of mine waste through production of engineered products from mine tailings; and decarbonization of industrial processes typically powered through heating by the combustion of fossil fuels.

SUMMARY

The described solar concentrator reactor system involves, among other things, technologies related to oxygen extraction from lunar regolith in three categories: solar concentrator technologies, novel oxygen extraction concepts, and lunar ice mining. The solar concentrator reactor system is a novel oxygen extraction concept that also addresses the need for efficient transmission of energy for oxygen/metal extraction. The solar concentrator reactor system technology may be incorporated with the Current State of the Art (CSOTA) oxygen extraction architectures and subsystems, building upon those innovations to improve production efficiency through falling particle heating and precision temperature control as well as addressing a number of other drawbacks associated with the CSOTA. With continuous processing and slag extrusion, SCORCHER increases oxygen production rates for multiple extraction processes, enables mass production of mechanical and structural components using the slag in an extrusion-style 3D printer or casting process, and enables thermal energy storage and transfer using the extruded slag parts as the thermal vessel mass for increased survivability during the lunar night (dual use).

The described solar concentrator reactor system provides, in one embodiment, a continuous feed falling particle reactor for rapidly heating lunar regolith (or other feedstock) to prescribed temperatures up to and exceeding 2,200° C. using Concentrated Solar Energy (CSE) and extracting oxygen through two of the top candidate extraction processes previously identified for lunar ISRU (carbothermal reduction, vapor phase pyrolysis). The solar concentrator reactor system, i.e., the SCORCHER system, implements solar thermal control technology for providing process-specific temperatures using CSE, a falling particle receiver design to more efficiently extract oxygen by maximizing bulk solar absorptance of regolith and total reaction area, and a continuous slag extrusion design enabling continuous processing and byproduct utilization as a crude fabrication material for casting, construction, and additive manufacturing. Benefits of the proposed innovation include a high solar thermal efficiency for heating lunar regolith (in one embodiment, estimated at over 68% overall efficiency), 1.7 kW reduction in electrical power requirements compared to an equivalent microwave or electrically-heated system, continuous oxygen extraction rather than a batch process, reduced regolith processing times, increased oxygen yields, high temperature pyrolysis capability (>2,000° C.) for direct oxygen extraction without a gas reactant, extraction process agnostic design for wide adaptability, temperature ramping to mitigate thermal shock and component failure, and secondary resource utilization of extruded slag for part fabrication, long duration thermal energy storage, or for smelting and secondary refining.

In one embodiment, the disclosure describes several designs or techniques that address the challenges and/or shortcomings of conventional approaches for oxygen extraction and/or production of molten reacted material from lunar and Martian regolith. For example, the solar concentrator reactor system comprises: 1) a fully enclosed chamber with an optical port or lens for transmitting concentrated sunlight into the chamber; 2) a mechanism for dispensing particles either as a sheet of falling particles or as a fluidized bed; 3) a vessel containing molten material undergoing a thermochemical reaction which is heated either directly by concentrated solar energy or indirectly from the heat of the irradiated particles; and 4) a nozzle for extruding reacted product (i.e., slag) in a molten state. Note that the solar concentrator reactor system may work with feedstock other than regolith, such as mining waste rock; iron ore; zinc oxide; agricultural waste for pyrolytic conversion to biochars and biofuels; ceramic particles and solid-to-liquid phase changing materials utilized in falling particle receivers; and basalt and other natural rock particles. Furthermore, although the disclosure describes embodiments involving reactions above a melting point of targeted materials, the systems and methods of the disclosure may also involve reactions below a melting point of a targeted material. Also, the disclosed systems and methods may operate or involve reactions of solid materials and/or liquid materials, so as to yield reacted solid materials and/or reacted liquid materials. The term "feedstock" and the phrase "raw materials" means a material that supplies or fuels a process or system.

The above components, individually and/or collectively, of the disclosed solar concentrator reactor system enable and/or provide the following features:

1) A vessel for collecting (e.g., pooling) irradiated material heated by CSE;

2) A CSE system for heating both a flow of particles in-flight and/or in a pool or pile of material by directly irradiating the material (and specially not by first heating a reactor tube, as performed by conventional systems);

3) An internally reflective CSE tower to redirect stray light, radiation from heated particles, and radiation from the heated pool or pile of particulate material back onto the falling particles and pool;

4) A falling particle feed system whose outlet profile and orientation are tailored to the solar flux density distribution of the concentrated solar spot;

5) A nozzle for extruding reacted material from a CSE tower or reactor chamber;

6) A sealed CSE reaction chamber to allow partial vacuum or precise concentrations of reactant gas;

7) A system and method (which may include one or more controllers and/or computer processors) for controlling the rate of extrusion of molten material from the outlet nozzle through, e.g., any combination of pressure inside the chamber, mass flowrate of feedstock, nozzle orifice area to include nozzle diameter, and/or temperature of the nozzle;

8) Heat transfer system at the nozzle outlet to control extrusion temperature and recover heat for: pre-heating reactant gases, pre-heating particles, generating electricity, and/or powering other thermochemical processes (the heat transfer system may include one or more controllers and/or computer processors);

9) A system for extruding the molten material into cast forms or additively manufactured parts; and 10) A sealed particle inlet system of, for example, an enclosed bin connected to the reactor chamber or an open bin with a vertical chute into the chamber with the packed chute to form a partial pressure seal and prevent the leakage of gases into or out of the reactor chamber.

The term "molten" means liquified by application of thermal energy, such as heating a stream of solid particles to create a liquid stream formed from the solid particles.

The phrases "reacted material" and "reactive material" mean a material that has undergone some degree of reaction, such as by way of application of thermal energy to cause a chemical reaction, either in a solid or molten state, to include a particle stream or particle material that receives heat to form a molten particle stream, a molten particle material, and/or a reacted particulate material.

The term "irradiated" means to expose to radiation, such as thermal radiation from a solar source or other thermal source which transfers thermal radiation through illumination.

The term "slag" means the more or less completely fused and vitrified matter separated during the reduction of a metal from its ore, to include an amorphous material used for 3D printing, casting, glass fining, and miscellaneous manufacturing or refining processes.

By way of providing additional background, context, and to further satisfy the written description requirements of 35 U.S.C. § 112, the following set of references are incorporated by reference in entirety: U.S. Pat. Appl. No. 63/280, 185 filed Nov. 17, 2021 entitled "Sintering End Effector for Regolith," and U.S. Pat. Appl. No. 62/910,666 filed Oct. 4, 2019 entitled "Apparatus to Produce Agglutinate Simulants."

In one embodiment, a solar concentrator reactor system is disclosed, the system comprising: a solar concentrator reactor having an enclosed vessel volume and comprising: a gas inlet inputting a first gas stream to the enclosed vessel volume, the first gas stream comprising a first gas; a gas outlet outputting a second gas stream from the enclosed vessel volume, the second gas comprising a second gas; a solar concentrator directing solar energy to a defined irradiating location within the enclosed vessel volume; a particle feed delivering a set of particles of a particle stream to the defined irradiating location; a controller operating to control the solar concentrator to direct solar energy to the defined irradiating location; and a slag processor comprising a slag extrusion nozzle and a slag outlet; wherein: the solar energy directed by the solar concentrator to the defined irradiating location irradiates the particles of the particle stream to produce a thermochemical reaction of the particles, the thermochemical reaction yielding the second gas and yielding a reacted material; the reacted material is extruded from the slag extrusion nozzle; and the second gas is emitted from the gas outlet.

In one aspect, the thermochemical reaction is associated with the first gas. In another aspect, the defined irradiating location is between a particle feed outlet of the particle feed and the slag processor. In another aspect, the defined irradiating location is at or adjacent to the slag processor. In another aspect, the reacted material forms a slag pool at or adjacent to the slag processor. In another aspect, the second gas is one of oxygen, carbon dioxide, carbon monoxide, and $H_2O$. In another aspect, the set of particles comprise lunar regolith. In another aspect, the controller further operates to control a rate of delivery of the particle stream and a rate of extrusion of the reacted material from a slag extrusion nozzle of the slag processor. In another aspect, the particle stream forms a falling sheet of particles.

In another embodiment, a method of using a solar concentrator reactor to produce a thermochemical reaction on a particle stream of particles is disclosed, the method comprising: providing a solar concentrator reactor having an enclosed vessel volume and comprising: a gas inlet in fluid communication with the enclosed vessel volume; a gas outlet in fluid communication with the enclosed vessel volume; a particle feed; a solar concentrator; a controller in communication with the particle feed and the solar concentrator; and a slag processor; supplying, by way of the gas inlet, a first gas stream to the enclosed vessel volume, the first gas stream comprising a first gas; delivering, by way of the particle feed, a set of particles of the particle stream to a defined irradiating location, the defined irradiating location within the enclosed vessel volume; directing solar energy by way of the solar concentrator to the defined irradiating location; irradiating the set of particles to produce a thermochemical reaction of the particles, the thermochemical reaction yielding a second gas and yielding a reacted material; emitting the second gas through the gas outlet; and extruding the reactive material from the slag processor; wherein: the controller controls a rate of delivery of the particle stream and controls a rate of extrusion of the reacted material from the slag processor.

In one aspect, the defined irradiating location is between a particle feed outlet of the particle feed and the slag processor. In another aspect, the defined irradiating location is at or adjacent to the slag processor. In another aspect, the reacted material forms a slag pool at or adjacent to the slag processor. In another aspect, the second gas is one of oxygen, carbon dioxide, carbon monoxide, and $H_2O$; and the set of particles comprise lunar regolith. In another aspect, the controller further operates to control a rate of delivery of the particle stream and a rate of extrusion of the reacted material from a slag extrusion nozzle of the slag processor. In another aspect, the particle stream is a falling sheet of particles.

In yet another embodiment, a solar concentrator reactor system comprising: a solar concentrator reactor comprising: an enclosed vessel volume having an enclosed vessel volume pressure; a solar concentrator directing solar energy to a defined irradiating location within the enclosed vessel volume; a particle feed delivering a set of particles of a particle stream at a selectable particle stream feed rate to the defined irradiating location; a controller comprising a computer processor; a slag processor comprising a slag extrusion nozzle having a nozzle temperature; wherein: the solar energy directed by the solar concentrator to the defined irradiating location irradiates the particles of the particle stream to produce a thermochemical reaction of the particles, the thermochemical reaction yielding a reacted material; the reacted material is extruded from the slag processor at a selectable extrusion rate; and the selectable extrusion rate is controlled by the controller by control of one or more of the enclosed vessel volume pressure, the nozzle orifice size, and the nozzle temperature.

In one aspect, the controller operates to: control the solar concentrator to direct solar energy to the defined irradiating location; and to control the selectable particle stream feed rate. In another aspect, the reacted material forms a reacted material pool at or adjacent to the slag processor; and the irradiating location is between a particle feed exit of the particle feed and the reacted material pool. In another aspect, the system further comprises: a gas inlet inputting a first gas stream to the enclosed vessel volume, the first gas stream comprising a first gas; a gas outlet outputting a second gas stream from the enclosed vessel volume, the second gas comprising a second gas; and a heat transfer device coupled to the slag extrusion nozzle operating to control a temperature of the reacted material; wherein the thermochemical reaction further yields the second gas.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U. S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The disclosed methods and/or systems may be readily implemented in software and/or firmware that can be stored on a storage medium to improve the performance of: a programmed general-purpose computer with the cooperation of a controller and memory, a special purpose computer, a microprocessor, a computer processor, or the like. In these instances, the systems and methods can be implemented as program embedded on personal computer such as an applet, JAVA.RTM. or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

FIG. 6 is a representation of a method of use of the solar concentrator reactor system of FIG. 1;

It should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto. FIG. 5 is a scaled drawing.

DETAILED DESCRIPTION

Figure 1:
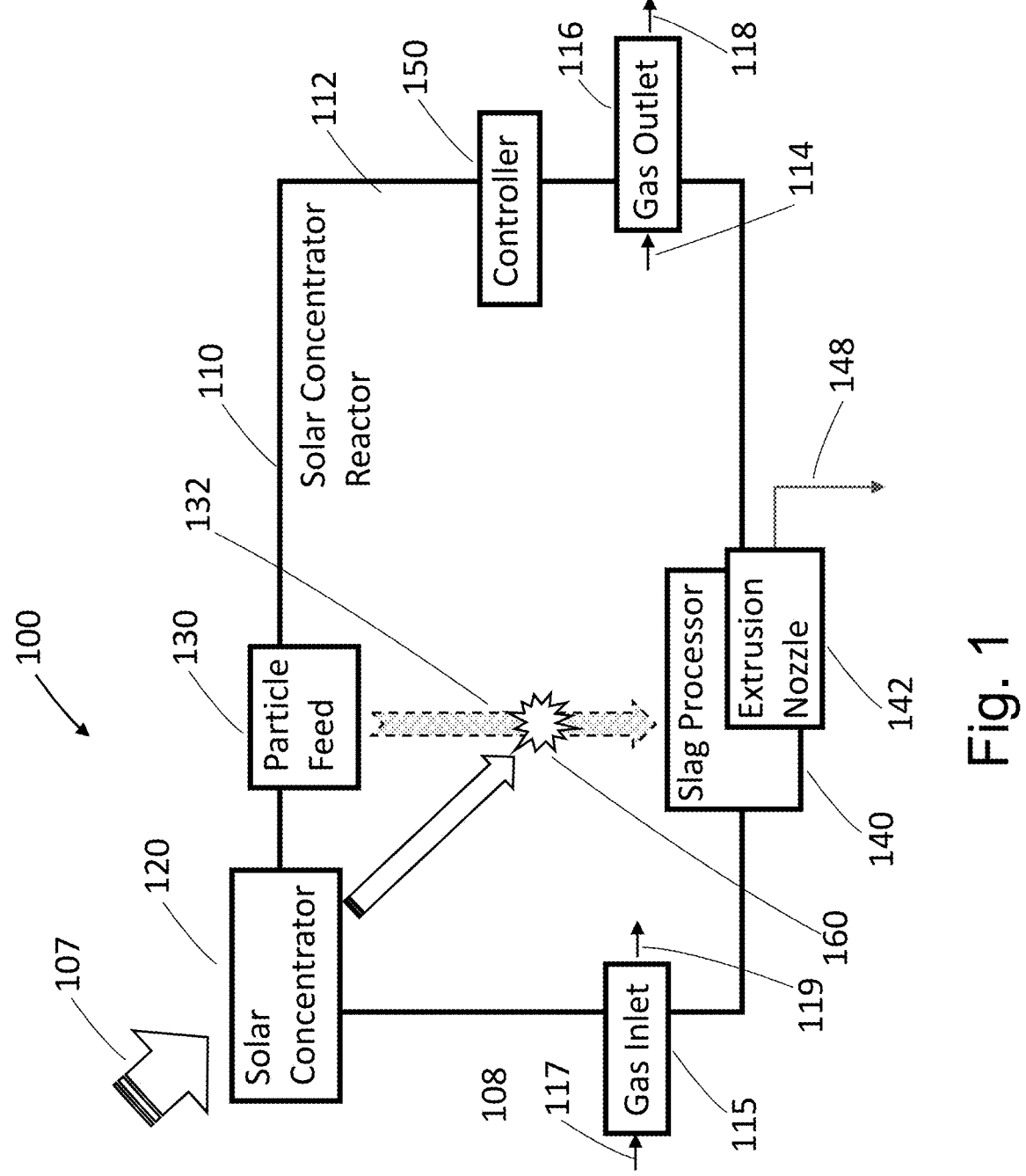
FIG. 1 is a schematic representation of one embodiment of solar concentrator reactor system.

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

The disclosed devices, systems, and methods of use will be described with reference to FIGS. 1-7. Generally, systems and methods to provide a solar concentrator reactor system for high temperature thermochemical processes are provided. In one embodiment, a solar concentrator reactor system heats particles mid-flight with concentrated solar energy, forms a molten pool of material, performs a thermochemical reaction, and extrudes the reacted product in a continuous process.

Although the disclosed devices, systems, and methods of use will be described relative to a solar concentrator reactor system for high temperature thermochemical processes, such as a high temperature thermochemical process to irradiate lunar regolith to produce molten reacted material and/or oxygen, the devices, systems, and methods of use have other applications. For example, the method and/or devices may be used to facilitate and/or enable 3-dimensional printing applications through, for example, a fused deposition modeling process. Also, components, elements, systems, or techniques described may be employed in prior art systems, such as a prior art carbothermal regolith reduction system (such as, for example, the carbothermal regolith reduction system described in *Demonstrating the solar carbothermal reduction of lunar regolith to produce oxygen*, Gustafson, 48th AIAA Aerospace Sciences Meeting Including the New Horizons Forum and Aerospace Exposition, 2010, incorporated by reference for all purposes).

Other applications or uses are possible. For example, the solar concentrator reactor system and associated technology is useful anywhere that electrical infrastructure is not established, and sufficient sunlight is available. Based on these features, the technology is ideal for underserved communities in the US (like rural towns and Native American Reservations) and around the world. A portable, multi-material reduction system enables advanced material processing and precious metal recycling/recovery with minimal operating costs.

The solar concentrator reactor system, aka SCORCHER, is designed to extract oxygen from lunar regolith using pyrolysis, carbothermal reduction, or other high-temperature reaction. The system concentrates sunlight onto a falling stream (and/or, e.g., a curtain) of particles, heats them to a molten state, and performs the oxygen extraction process on particles in flight and/or from the surface of the molten pool which forms underneath the falling particle stream. These reactions may be performed in vacuum in the case of vacuum pyrolysis or vapor phase pyrolysis, or with gas reactant flooding the reactor chamber for carbothermal reduction or other reduction reaction. The reacted molten slag is then extruded out of the base of the chamber through a nozzle which maintains an airtight seal. The speed of extruded slag may be actively controlled by the temperature of the nozzle and the pressure inside of the chamber, for example, by way of one or more controllers and/or computer processors. The slag may be used for secondary processes such as heat recovery for power production, further refining, or manufacturing in the case of fused deposition modeling, pulling of continuous fibers, or the casting of parts. The design of the system is agnostic to the type of reaction being performed or the desired products of the reaction.

FIGS. 1 and 6 present a respective system 100 and method 600 of use of a generalized solar concentrator reactor system. More specific designs or embodiments of a solar concentrator reactor system or elements thereof are described in FIGS. 2-5 and 7.

With attention to FIG. 1, one embodiment of a solar concentrator reactor system 100 is described. Most generally, the solar concentrator reactor system 100 directs concentrated solar energy 108 to a set of falling particles 132 at a defined irradiating location 160 within an enclosed vessel volume 112 wherein a thermochemical reaction occurs. The thermochemical reaction yields or produces a molten reacted material and a second gas 114. The second gas 114 that is produced as a result of the thermochemical reaction is different than a first gas 119 that enters the enclosed vessel volume 112. (The first and second gas streams are discussed in more detail below).

The solar concentrator reactor system 100 comprises a solar concentrator reactor 110, the solar concentrator reactor 110 receiving solar energy 107, such as from the sun. In some embodiments, the solar concentrator reactor 110 receives solar energy 107 from sources other than or in addition to the sun, such as any available solar power or energy source known to those skilled in the art.

The solar concentrator reactor 110 comprises a solar concentrator 120, a particle feed 130, a controller 150, a slag processor 140 comprising a slag extrusion nozzle 142, a gas inlet 115, and a gas outlet 116. The solar concentrator reactor 110 forms an enclosed vessel volume 112. (In alternate embodiments, the solar concentrator reactor operates without an enclosed vessel volume but instead operates in an "open air" or "open atmosphere" or otherwise non-enclosed manner. For example, the solar concentrator reactor and thus the solar concentrator reactor system may operate in an open air process which, for example, operates to melt waste rock from mines to form extruded products, or melts regolith simply for extrusion without capturing gas products, etc.).

The gas inlet 115 receives a first gas as a first gas input stream 117 from a source external to the enclosed vessel volume 112. The first gas input stream 117 is coupled to or in fluid communication with gas inlet 115. The gas inlet 115 receives first gas input stream 117 and provides or supplies a first gas output stream 119 to the enclosed vessel volume 112. The first gas output stream 119 is coupled or in fluid communication with gas inlet 115. In one embodiment, the first gas input stream 117 and the first gas output stream 119 comprise a similar if not identical gas type, termed a first gas type. In one embodiment, the gas inlet 115 alters or adjusts one or more characteristics of the first gas type of the first gas input stream 117 to produce the first gas output stream 119, e.g., pressure is adjusted.

The gas outlet 116 receives a second gas as a second gas input stream 114 from the enclosed vessel volume 112 and outputs or emits a second gas output stream 118 to a source or location external to the enclosed vessel volume 112. The second gas input stream 114 is coupled to or in fluid communication with gas outlet 116. The gas outlet 116 receives second gas input stream 114 from the enclosed vessel volume 112 and provides or supplies a second gas output stream 118 to an external source. The second gas output stream 118 is coupled to or in fluid communication with gas outlet 116. In one embodiment, the second gas input stream 114 and the second gas output stream 118 comprise a similar if not identical gas type, termed a second gas type. In one embodiment, the gas outlet 116 alters or adjusts one or more characteristics of the second gas type of the second gas input stream 114 to produce the second gas output stream 118, e.g., pressure is adjusted.

One or both of first gas streams 117, 119 and second gas streams 114, 118 may be controlled at least in part by controller 150, e.g., the flow rate of the respective streams may be controlled through one or more valves controlled by controller 150.

The solar concentrator 120 receives solar energy 107 and concentrates the solar energy 107 to form a directed solar energy beam 108. (Note that the term "light beam" is used to mean any directed or focused energy source, to include a beam forming a narrowing cone). The directed energy beam 108 may be at any selectable incidence angle relative to the solar concentrator reactor 110 and/or the enclosed vessel volume 112. In FIG. 1, the solar energy 107, and the directed solar energy light beam 108, and shown at an incidence angle with respect to pure vertical. Stated another way, the solar energy 107 and/or the directed solar energy light beam 108 may engage or enter the enclosed vessel volume 112 of the solar concentrator reactor 110 from the top (a zero degree incidence angle) of the enclosed vessel volume 112 or from the side (a non-zero degree incidence angle). The directed solar energy beam 108 is focused or directed to or at a defined irradiating location 160. The defined irradiating location 160 may be selectable by a user and/or automated system and may be controlled by controller 150.

A thermochemical reaction occurs at or near the defined irradiating location. The defined irradiating location 160 may be any one or more locations within the enclosed vessel volume 112, to include, e.g., a position between an outlet of the particle feed 130 and the slag processor 140, and at or adjacent the slag processor 140. The thermochemical reaction may yield a molten reactive material which may form a molten slag pool at or adjacent the slag processor.

Figure 4:
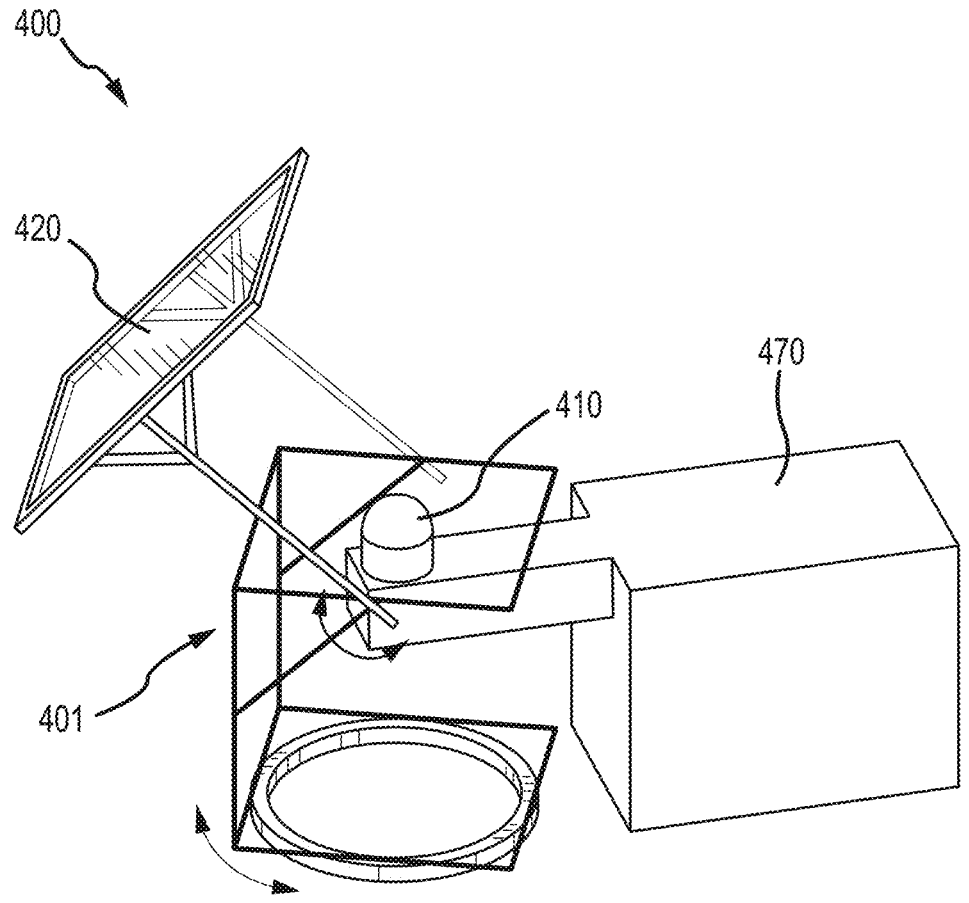
FIG. 4 is a perspective view representation of yet another embodiment of a solar concentrator reactor system.

The solar concentrator 120 may comprise a rotating frame as depicted in FIG. 4 (described below) which may be controlled by the controller 150. The rotating frame or other aspects of the solar concentrator may comprise components and/or systems described in U.S. Pat. No. 11,162,713 entitled "Light Concentrator System for Precision Thermal Processes" to Garvey et al, filed Dec. 12, 2019, incorporated by reference in entirety for all purposes.

In one embodiment, a secondary concentrator of a design similar to that described in U.S. Pat. Appl. No. 63/280,185 entitled "Sintering End Effector for Regolith" to Brewer et al, filed Nov. 17, 2021 (incorporated by reference in entirety for all purposes) is used for secondary light concentration into or within the solar concentrator reactor 110 reactor.

The particle feed 130 receives and transports or supplies a set of particles 132 to the enclosed vessel volume 112. The set of particles 132 descend or fall (e.g., by way of gravity) from the particle feed 130 into the enclosed vessel volume 112 from an upper portion of the enclosed vessel volume 112 to a lower portion of the enclosed vessel volume 112. The particle feed 130 is disposed at the upper portion of the enclosed vessel volume 112. The slag processor 140 is disposed at the lower portion of the enclosed vessel volume 112. (Note that the slag processor 140 in no way is limited to processing slag, but instead may process all or a portion of any irradiated particle stream).

In some embodiments, the movement of the set of particles 132 supplied or delivered by the particle feed 130 is facilitated by techniques other than or additive to gravity, such as, e.g., by a pressure feed or vibratory conveyor. The particle feed may comprise an auger to facilitate, among other things, a steady and predictable delivery of a set of particles. Additional description of augers of the particle feed 130 are described below, to include with respect to FIGS. 3A-B. The particle feed 130 may be controlled at least partially by the controller 150. In one embodiment, the particle feed 130 supplied a set of particles as a falling sheet of particles. The irradiation of the falling particles may occur in any of several configurations, as described, for example, in FIGS. 7A-C below. The particles may be derived from or be a regolith, a lunar regolith, or any set of fine particles.

The slag processor 140 receives, holds, and/or processes molten reacted material generated or yielded by the thermochemical reaction occurring at the defined irradiating location 160. (In one embodiment as described above, the defined irradiating location 160 and thus the thermochemical reaction may occur at or adjacent the slag processor). The molten reacted material is extruded from the enclosed vessel volume through the extrusion nozzle 142 to produce a molten reacted material stream 148. Parameters of the molten reacted material stream 148 may be controlled by the controller 150, with aid of one or more sensors measuring, e.g., enclosed vessel volume 112 temperature, pressure, etc., and/or with aid of one or more sub-components such as flow valves associated with the extrusion nozzle 142. Additional disclosure of the slag processor 140 and/or slag extrusion nozzle 142 are provided below, to include with respect to FIG. 5.

As briefly described above, gas inlet 115 receives a first gas as a first gas stream 117 from a source external to the enclosed vessel volume 112, the first gas stream 117 provided or supplied to the enclosed vessel volume 112. The gas outlet 116 receives a second gas as a second gas stream 114 from the enclosed vessel volume 112 and outputs or emits the second gas to a source or location external to the enclosed vessel volume 112. In one embodiment, the second gas comprises or is oxygen, wherein an oxygen extraction system 470 may be fitted to engage with the second gas stream 118 as the second gas stream 118 is emitted from the enclosed vessel volume 112 (See FIG. 4 for additional description of the oxygen extraction system 470).

In one embodiment, the enclosed vessel volume 112 maintains an absolute vacuum, a substantially absolute vacuum, or a partial vacuum. In one embodiment, the enclosed vessel volume 112 maintains an absolute vacuum or a substantially absolute vacuum, and no first gas stream is used or required.

Figure 2:
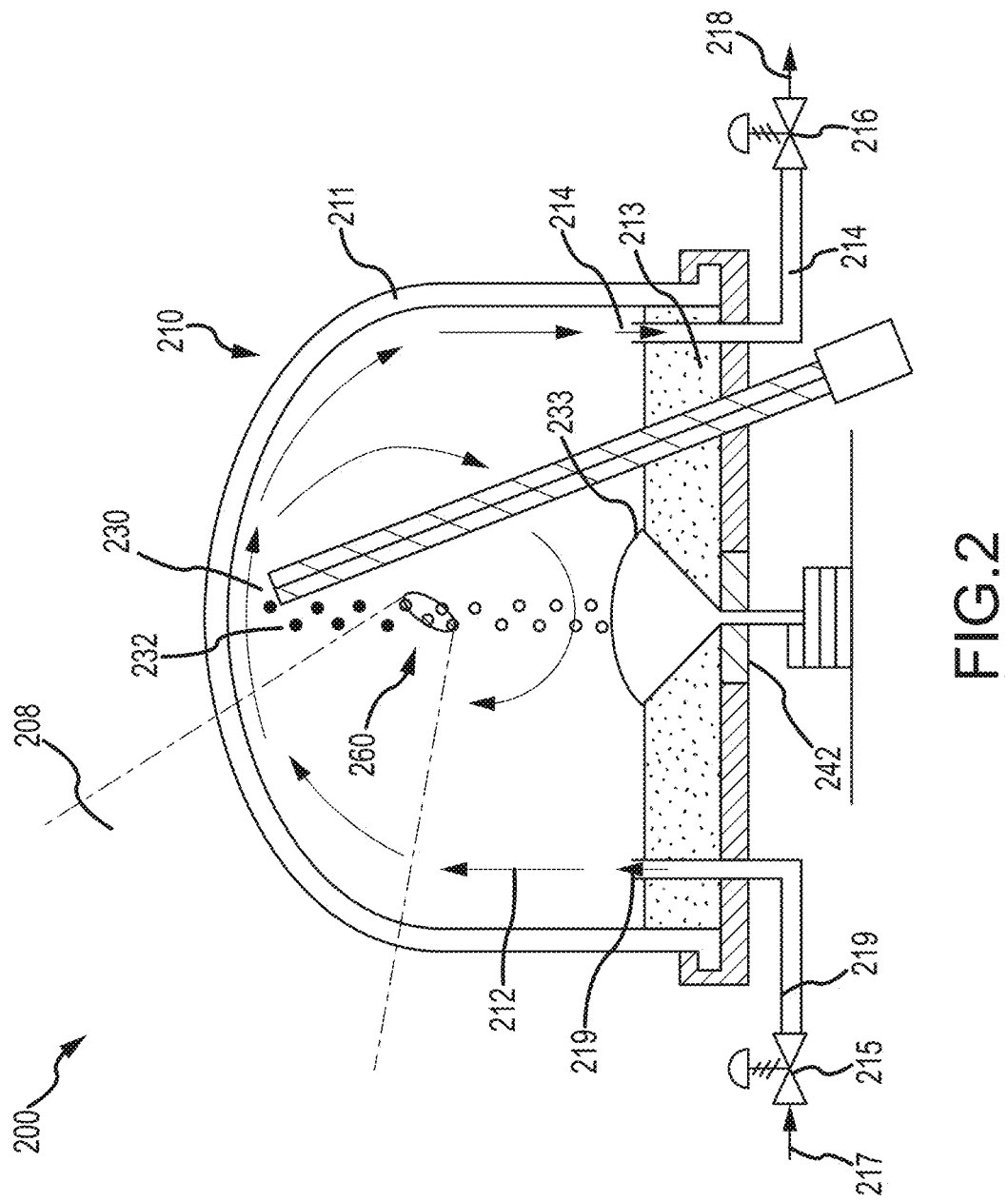
FIG. 2 is a cross sectional side view representation of another embodiment of a solar concentrator reactor system.

FIG. 2 describes another embodiment of a solar concentrator reactor system 200 comprising a solar concentrator reactor 210 (aka SCORCHER) with key components annotated. The solar concentrator reactor (not shown) of the solar concentrator reactor system 200 creates or delivers concentrated solar energy 208 to a defined irradiating location (aka a concentrated solar focal point/vaporization zone) 260 within an enclosed vessel volume 212. The enclosed vessel volume is defined by a clear reactor shell 211. In one embodiment, the solar concentrator reactor forms an enclosed and light-tight volume or chamber, with a transparent window to receive concentrated solar energy 208.

A thermochemical reaction occurs at the defined irradiating location 260 within an enclosed vessel volume 212 when the set of falling particles 232 are irradiated. The thermochemical reaction yields or produces a molten reacted material and a second gas 214. The second gas 214 that is produced as a result of the thermochemical reaction is different than a first gas 219 that enters the enclosed vessel volume 212. The molten reacted material is collected or gathers as a molten reacted material pool (aka a molten slag pool or slag pool) 233 which in turn is fed into a slag extrusion nozzle 242. A layer of insulation 213 is disposed at the bottom of the clear reactor shell 211. The layer of insulation 213 may consist of non-reacted particles from the particle feed 232 to form a skull through which the molten reacted material 233 is allowed to flow.

More generally, in some embodiments a thermochemical reaction occurs at one or more irradiating locations and yields or produces an irradiated particle stream, the irradiated particle stream comprising a combination of molten and solid particles. An irradiated particle stream is more generally referred to as a reactive particle stream and/or a reacted particle stream (a reactive particle stream undergoing a chemical reaction, and a reacted particle stream having completed or substantially completed a chemical reaction). For example, in one embodiment of the solar concentrator reactor system of the disclosure, a stream or set of particles are irradiated to form an irradiated particle stream which collects to form an irradiated pool of irradiated particles, the irradiated pool of irradiated particles being reactive while collected in the irradiated pool, the irradiated pool of irradiated particles then extruded or exited from the solar concentrator reactor system as a reacted stream of material.

The gas inlet 215 receives a first gas as a first gas input stream 217 from a source external to the enclosed vessel volume 212. The first gas input stream 217 is coupled to or in fluid communication with gas inlet 215. The gas inlet 215 receives first gas input stream 217 and provides or supplies a first gas output stream 219 to the enclosed vessel volume 212. The first gas output stream 219 is coupled or in fluid communication with gas inlet 215. In one embodiment, the first gas input stream 217 and the first gas output stream 219 comprise a similar if not identical gas type, termed a first gas type. In one embodiment, the gas inlet 215 alters or adjusts one or more characteristics of the first gas type of the first gas input stream 217 to produce the first gas output stream 219, e.g., pressure is adjusted.

The gas outlet 216 receives a second gas as a second gas input stream 214 from the enclosed vessel volume 212 and outputs or emits a second gas output stream 218 to a source or location external to the enclosed vessel volume 212. The second gas input stream 214 is coupled to or in fluid communication with gas outlet 216. The gas outlet 216 receives second gas input stream 214 from the enclosed vessel volume 212 and provides or supplies a second gas output stream 218 to an external source. The second gas output stream 218 is coupled to or in fluid communication with gas outlet 216. In one embodiment, the second gas input stream 214 and the second gas output stream 218 comprise a similar if not identical gas type, termed a second gas type. In one embodiment, the gas outlet 216 alters or adjusts one or more characteristics of the second gas type of the second gas input stream 214 to produce the second gas output stream 218, e.g., pressure is adjusted.

One or both of first gas streams 217, 219 and second gas streams 214, 218 may be controlled at least in part by a controller (not shown), e.g., the flow rate of the respective streams may be controlled through one or more valves controlled by controller.

The SCORCHER may be broken down into four major subsystems: 1) a light concentrating system that tracks the sun, controls CSE flux, and delivers CSE directly to the particle stream, (2) a falling particle reactor containing the high-temperature extraction process and interfacing with all other subsystems, (3) a particle feed system 230 delivering a set of falling (e.g., regolith) particles 232, (4) a gas handling system for delivering reactants and extracting product gases, and (5) a slag extrusion nozzle 242 and material handling system to remove molten reacted material. Each of these subsystems work together to maximize process efficiency and production rate, regardless of the oxygen extraction process used.

The enclosed vessel volume 212 has an enclosed vessel volume pressure. The particle feed 230 delivers the set of particles of a particle stream 232 at a selectable particle stream feed rate to the defined irradiating location 260. The slag extrusion nozzle 242 has a nozzle temperature. The molten reacted material is extruded from the slag processor, by way of the slag nozzle, at a selectable extrusion rate.

A controller comprising a processor may control one or more of the enclosed vessel volume pressure to a selectable enclosed vessel volume pressure, the particle stream feed rate to a selectable particle stream feed rate, and the extrusion rate at a selectable extrusion rate. In one embodiment, the controller controls the selectable extrusion rate by control of one or more of the enclosed vessel volume pressure and the nozzle temperature.

Overall, a particle stream is fed into the system 200 without the need for extensive beneficiation using CSOTA for particulate matter delivery. (Note that in one embodiment, the system 200 uses or processes or engages with a particle stream that comprises lunar regolith. Also, while the description frequently refers to the particle matter as regolith, the system is not limited to use of particle matter being regolith; indeed, the system may process or use any particle matter known to those skilled in the art).) An auger 230 feeds regolith into the reactor 210 at a specified rate for optimal CSE absorption. (Note that other means to deliver particles into the reactor are possible as known to those skilled in the art). The particle stream 232 falls through the focal point 260 of a solar concentrator enabling rapid thermal absorption and rapid gas production by maximizing particle exposure to direct CSE and, in the case of carbothermal reduction, a gas phase reactant. Concentrated sunlight 208 is applied directly from the concentrator passing through a clear reactor shell 211 or optical port, thereby minimizing energy losses and maximizing range of motion for tracking the sun. (In one embodiment, a portion of the reactor shell is a refractive optic, which receives solar energy, to eliminate the optical transmission loss source associated with the reactor shell 211. That is, the concentrating optic is integrated into the reactor 210 as an optical port. Stated another away, rather than an external refractive optic positioned outside of the reactor shell 211 which then passes refracted light into or through the optics of the reactor shell 211, the reactor shell 211 itself has a portion forming the refractive light concentrating optic, thereby eliminating the external light concentrating optic).

Gas reactants (e.g., first gas output stream 219) are fed into the reactor between the incoming sunlight and the concentrator's focal point while product gases are drawn out of the reactor (e.g., second gas input stream 214) opposite the focal point in order to create a flow path between the reactor shell 211 and the vaporizing particles to prevent fouling the reactor shell 211 which would otherwise reduce light transmission. Product gases (e.g., second gas input stream 214) are removed from the reactor at a specified rate (by way of a system controller) through the gas outlet 216 using control valves. All of the gases in the outlet flow are sent to secondary CSOTA processing steps (rapid quenching for vapor phase pyrolysis or hydrogen reforming in a methane reactor for carbothermal reduction). The reactor 210 base is thermally insulated (insulator 213) with solid particles to prevent corrosion of the reactor and any remaining solids fall through the CSE focal point and onto a volume of now molten slag within the reactor 210. The force of gravity coupled with a slight differential pressure between the reactor and vacuum of space forces the molten slag through a nozzle 242 at the bottom of the reactor 210 enabling continuous operation and extrusion of the reacted molten product.

With attention to FIG. 4, an embodiment of a solar concentrator reactor system 400 that integrates a solar concentrator reactor 410 with a solar concentrator 420 and an oxygen extraction system 470 is depicted. The solar concentrator 420 is fitted with or coupled to a rotating frame 401 to allow the solar concentrator 420 to be oriented or positioned relative to a solar source (e.g., the sun).

The solar concentrator 420 subsystem provides an abundance of thermal power that may be freely harvested and is available in abundance on the Moon. CSE as a heat source has been demonstrated for carbothermal reduction and has the potential to greatly reduce the electrical power required to perform vapor phase pyrolysis. The solar concentrator/concentration system 420 for the solar concentrator reactor system (aka SCORCHER) 410 may take several forms in its final implementation including, for example, the Solar Energy Module (SEM) developed by Physical Sciences Inc. (PSI) that utilizes a series of parabolic mirrors to focus light into fiber optic bundles for CSE delivery. The primary benefit to PSI's SEM is the freedom to deliver CSE to any point at any orientation independent of the concentrating lenses. The downfall of PSI's module is its 33% thermal efficiency, losing 66% of the CSE through the process.

With regard to the disclosed solar concentrator reactor system 410, a primary Fresnel lens concentrator (92% transmission across the solar spectrum) and a transparent reactor shell (estimated at 92% transmission to account for surface reflectance) may be employed. The simplified optics enable 85% overall solar transmission and requires much less mass compared to PSI's module of machined parabolic concentrators and fiber optic interfacing. (Note that this 15% optical transmission loss may be eliminated if a portion of the reactor shell is a refractive light concentrating optic, as described above). The optics design distances the concentrating optics from the heated spot to mitigate the issue of optical components overheating, which is of significant concern for any fiber optic system where components are required to be in close proximity to the irradiating location.

As shown in FIG. 4, the concentrator 420 rotates about its focal point as the reactor 410 remains stationary. Potential efficiency losses from an increased angle of incidence of the sunlight hitting the irradiated particles are reduced due to the falling particle design where individual particles act as a high efficiency optical absorber regardless of angle of incidence of incoming light. The falling particles also act as absorbers for light reflected off of, and radiated from, other falling particles. This method enables a wide range of motion for solar tracking with high efficiency transmission of solar thermal energy for the rapid heating of regolith and other particle types (estimated at >68% overall solar-to-thermal efficiency accounting for 85% optical efficiency and assuming 20% average regolith reflectivity).

Many solar concentrators have been designed that may be utilized with the solar concentrator reactor system 410 of the disclosure for oxygen extraction including heliostat arrays, parabolic mirrors, and Fresnel lenses. The best concentrator for a given design will depend on the spacecraft, launch limitations, and operating requirements.

Fresnel lenses may be made of glass, flexible UV treated acrylic to minimize weight, or optical silicone for durability across greater ranges in operating temperature. Thin optics may deliver high light concentration ratios while minimizing weight and volume for compact stowage and may be designed to inflate, unfold, or unroll for space deployment.

The solar concentrator reactor system's solar concentrator system with thermal control was developed using a Fresnel lens primary collector, making it a natural choice for some embodiments of the SCORCHER. However, the concentrator system provides the same thermal transmission efficiency gains and continuous processing capability using a parabolic reflector or any other concentrator developed specifically for use on the Moon. (Note that while solar energy is described as an energy source for the embodiments of the solar concentrator reactor system, other energy sources may be used, such as lasers).

The solar concentrator reactor system's solar concentrator system may utilize a shutter system and variable lens distance with active feedback control (by way of a controller) for delivering specific processing temperatures and maintaining these controlled temperatures for long durations. This technology enables gradual temperature ramping to minimize thermal stress in components as well as consistent user-specified processing temperatures over long durations for maximizing extraction process efficiency.

The solar concentrator reactor system has demonstrated the ability to deliver up to 1.1 kW of CSE to a working surface (1.2 m² Fresnel lens capacity, 92% transmission), sinter ruthenium powder (2,300° C. melting temperature), rapidly melt an array of materials (lunar regolith simulant, carbon steel, iron, aluminum, etc.), and maintain temperatures to within 1% of the set temperature despite changes in incoming solar irradiance. This well-instrumented solar concentrator unit (SCU) was used for SCORCHER process development. The solar concentrator unit (SCU) has a functional footprint of 12 m³ (notionally<1 m³ packed volume), weighs 50 kg, requires 35 W of electrical power on average (65 W peak), and includes advanced instrumentation for monitoring and characterizing incoming solar irradiance and CSE thermal processes.

Concentrated solar energy has been applied experimentally to high temperature applications such as welding of metals, large-scale power generation by heating a receiver tower containing molten salts, and high temperature materials processing including surface hardening of steels, surface melting of grey cast iron for greater resistance to wear, cladding of stainless steel, and sintering of metallic powders for consolidation of "green parts." NASA has multiple systems where concentrated solar energy could be utilized. Past investigations and implementations by NASA include the Shooting Star experiment, regolith sintering experiments, and enhancing photovoltaic efficiency.

Returning to FIG. 2, a depiction of the overall functionality of the solar concentrator reactor system 200 aka falling particle reactor system is presented. Implementing a falling particle receiver design has many benefits.

First, it enables rapid absorption of CSE by individual regolith particles eliminating issues of limited penetration depth and high reflectivity of molten regolith which are commonly associated with direct solar heating of regolith. Second, it facilitates oxygen production by increasing the surface area of regolith exposed to reactant gases (like methane for carbothermal reduction) or vacuum, while extending CSE exposure time (or particle residence aka dwell time). This method also prevents molten boiling that can occur when heating some volume of regolith to vaporization temperatures causing splattering and optical degradation of the system over time. Third, it allows the reactor 410 wall temperatures to be significantly lower than the processing temperatures by performing the extraction process without the molten product being in direct contact with critical components, thereby enabling processing temperatures that are greater than what the reactor materials themselves can handle. This enables the use of a Pyrex or fused quartz bell jar as the reactor chamber even for very high temperature pyrolysis since conductive heat transfer is minimized.

The design leverages multiple lessons learned in previous development efforts including insulating the base of the reactor with lunar regolith (insulation 213) to prevent reactor corrosion and overheating, utilizing gas flow to prevent the clear reactor shell or optical port from fouling, temperature ramping to reduce thermal shock of reactor components, and low-pressure differentials to prevent failure of the reactor shell or optical port. Implementing a molten slag extrusion nozzle 242 enables a continuous processing method as well as secondary and tertiary resource utilization by producing a slag with high metal content for smelting and secondary processing, manufacturing usable parts through casting and/or additive manufacturing methods (secondary), and using the hot extruded mass as thermal reservoirs for producing electricity or storing and transferring residual heat to other systems to support survival strategies during the lunar night (tertiary).

As an assessment of feasibility, calculations of particle residence times and energy absorption for regolith particles in a concentrated solar falling particle receiver may be made with the following energy equations.

$$Q_p = \eta_c C S a A * t_{residence}$$

$$T_p = \frac{Q_p / m_p}{c_p} + T_i$$

where $Q_p$ is the energy absorbed by a regolith particle, qc is the optical system efficiency (85%), C is the light concentration ratio (10,000), S is the solar flux (1360 W/m² on the Moon), a is the absorptance of the particle (assumed 0.8 for regolith across the solar spectrum), A is the area of the particle exposed to radiation (half sphere, 0.125 mm mean particle diameter), $t_{residence}$ is the residence time of the particle in the solar spot, $T_p$ is end temperature of the particle, $m_p$ is the mass of the particle, $c_p$ is the specific heat of the particle (1150 J/kg*K), and $T_i$ is the initial temperature of the particle (400 K). In lunar gravity without gas flow, a stream of particles with 0.125 mm diameter falling 1.27 cm before passing through a 1.27 cm CSE focal spot will have a particle residence time of 0.05 s.

Assuming a small 1 m² concentrator with 10,000× concentration ratio and 85% optical efficiency, 0.01 J of energy gets absorbed by each 0.125 mm particle of regolith—much more than is required to heat them to 1,400° C. for carbothermal reduction and 2,200° C. for vapor phase pyrolysis. Assuming 5% oxygen recovery by mass of regolith with 1500 K processing temperature, the SCORCHER 410 presented here may extract 0.1 kg/hr of oxygen from the regolith producing 1.9 kg/hr of slag. This is a conservative estimate based on 2-11% oxygen recovery measured for solar carbothermal reduction, 8-33% oxygen recovery measured for plasma vapor phase pyrolysis, and 0.1-10% mass loss measured in early solar vapor phase pyrolysis experiments.

The particle residence time in the reactor 410 may be controlled with the concentrated spot size, particle drop height, and potentially a counterflow of the inlet gas. For carbothermal reduction, the inlet gas may be methane. For vapor phase pyrolysis, the inlet gas may be either recirculated product gas or an inert gas like argon. The optimal residence time may be determined through numerical modeling and/or extensive experimentation to maximize the percentage of molten particles landing in the bottom of the reactor to form the molten pool of slag. If the molten pool requires supplemental heating, then the concentrator may be angled so that excess energy passes the focal point into the molten area, keeping it hot with light not absorbed by the irradiated particles. After enough molten slag accumulates at the bottom of the reactor, the hydraulic head of the molten column and a slight over-pressurization will build up in the reactor forcing slag extrusion. This pressure may be controlled with a pressure regulator on the gas flow inlet and a relief valve on the gas flow outlet. By controlling the internal pressure of the reactor (by a controller), the extrusion rate may be controlled, enabling a controlled extrusion rate of the slag. In the absence of a pressure differential between the reactor volume and the slag extrusion volume, slag temperature and extrusion orifice size may be used to control (by a controller) the extrusion rate.

Aside from the insulating regolith 213, the slag extrusion nozzle 242 is the only component that comes in contact with molten regolith and may be replaced periodically if corrosion occurs. However, the volume of the molten pool inside the reactor 410 and the distance of the molten pool from the CSE focal point 260 may be designed such that the molten slag will cool to just above its melting temperature (~1,100° C.) by the time it reaches the nozzle 242, minimizing the corrosive effects of the molten material while still allowing for material extrusion. Furthermore, these nozzles 242 could potentially be made from cast molten regolith, allowing manufacture on the Moon. An electric coil may be used to heat the nozzle 242 to promote flow of the molten regolith and prevent clogging. Alternate and/or additional extrusion design considerations include optimal orifice diameter, nozzle temperature, and reactor pressure. The molten pool may be cooled prior to its extrusion through a heat recovery system capable of generating electricity and/or preheating the inlet particle feed.

The particle feed 230 system, aka the regolith feed system, utilizes a dual gate valve/closed auger design, such as that of Gustafson (referenced above), for delivering loosely processed regolith to an isolation hopper that acts as an air lock before feeding the regolith into the falling particle reactor with a second auger. This allows for regolith to be loaded into the pressure controlled environment in large batches and fed continuously into the reactor without affecting the internal atmosphere of the reactor.

In another embodiment which enables a continuous feed, a dual lock hopper is employed, as used commonly in industrial processes to reduce energy requirements for pressurization and depressurization of the air-lock chamber by as much as 40%. The dual lock hopper approach may be adapted to the dual gate valve/closed auger design to reduce energy requirements while preventing regolith from contacting sealing surfaces, but at the cost of significant additional system mass. Note that an important feature of a secondary auger feed is the ability to deliver regolith particles to the reactor at a user specified rate. This was achieved with a custom built small diameter auger with a flat outlet to form a thin sheet of particles and maximize the number of particles exposed to the concentrated solar spot. A prototype of one embodiment of a solar concentrator reactor system was constructed and is described with regards to FIGS. 3-5. This embodiment may be termed the "prototype embodiment."

The solar concentrator reactor system prototype 300, 400 embodiment uses a 1 m² Fresnel lens conservatively producing 0.1 kg $O_2$/hr (as described above) with minimal power required for actuators and sensors (350 Wh/kg $O_2$). This production rate may be scaled to meet a 1.85 kg $O_2$/hr full-scale requirement by increasing the concentrator size or implementing an array of concentrators to produce a 18.5 m² solar collection area without significantly increasing the system's electrical load, resulting in more efficient production rates at full scale (<<350 Wh/kg $O_2$). The reactor 310, 410 size and regolith feed rate may be increased to accommodate larger volumes of regolith and meet a full-scale production requirement.

The solar concentrator reactor system 300 prototype embodiment (a lab-scale system) uses the afore-described Solar Concentrator Unit 420 which employs a frame 401 for a solar concentrating lens with automated sun tracking and a shutter system for controlling the solar power transmitted into the reactor 310, 410.

In the solar concentrator reactor system 300, 400 prototype embodiment, a hemispherical transparent dome (forming an enclosed vessel volume) is used as the external reactor shell and an auger 330 feeds lunar regolith simulant to the top of the reactor 310 and it is then dispensed as a sheet through a concentrated solar spot. The solar-to-thermal efficiency of the system 300, 400 is highest when the particles are heated to a molten state and to their maximum reaction temperature while in flight. The concentrated cone of light 308 from the lens may be pointed near the surface of where the molten pool forms such that stray light which misses the particles then irradiates the surface of the molten pool to maintain the reaction temperature. Note that a falling particle feed system is not required and that alternate methods may be used for manipulating the particle trajectories so that they pass through the concentrated spot such as a fluidized bed or a pneumatic particle nozzle.

Furthermore, a pilot plant or production facility could be designed from these same principles. The design would be similar to a solar Falling Particle Receiver in which a field of heliostats directs light through the window of a concentrated solar tower to heat particles as they fall. The primary difference from these systems would be an air-tight reactor chamber and incorporation of a molten pool and slag extrusion system to facilitate higher temperature processes.

The solar concentrator reactor system 300, 400 prototype embodiment follows the concept sketch of FIG. 2 only implements system features that are critical to demonstrating concept feasibility. The prototype utilizes the Solar Concentrator Unit (SCU) aka solar concentrator 420 with precision thermal control for providing CSE (See FIG. 4). The critical features demonstrated include: (1) the ability to deliver regolith particles into a controlled reactor environment as a falling particle stream passing through a solar concentrator focal point, (2) the ability to produce particle temperatures exceeding a selectable temperature, e.g., 1,000° C., (3) the ability to maintain lower temperatures (<200° C.) on the reactor body, and (4) the ability to extrude molten slag. The selectable temperature, in one embodiment, may be at least 1,000° C. The selectable temperature, in one embodiment, may be about 1,000° C.

Figure 3A:
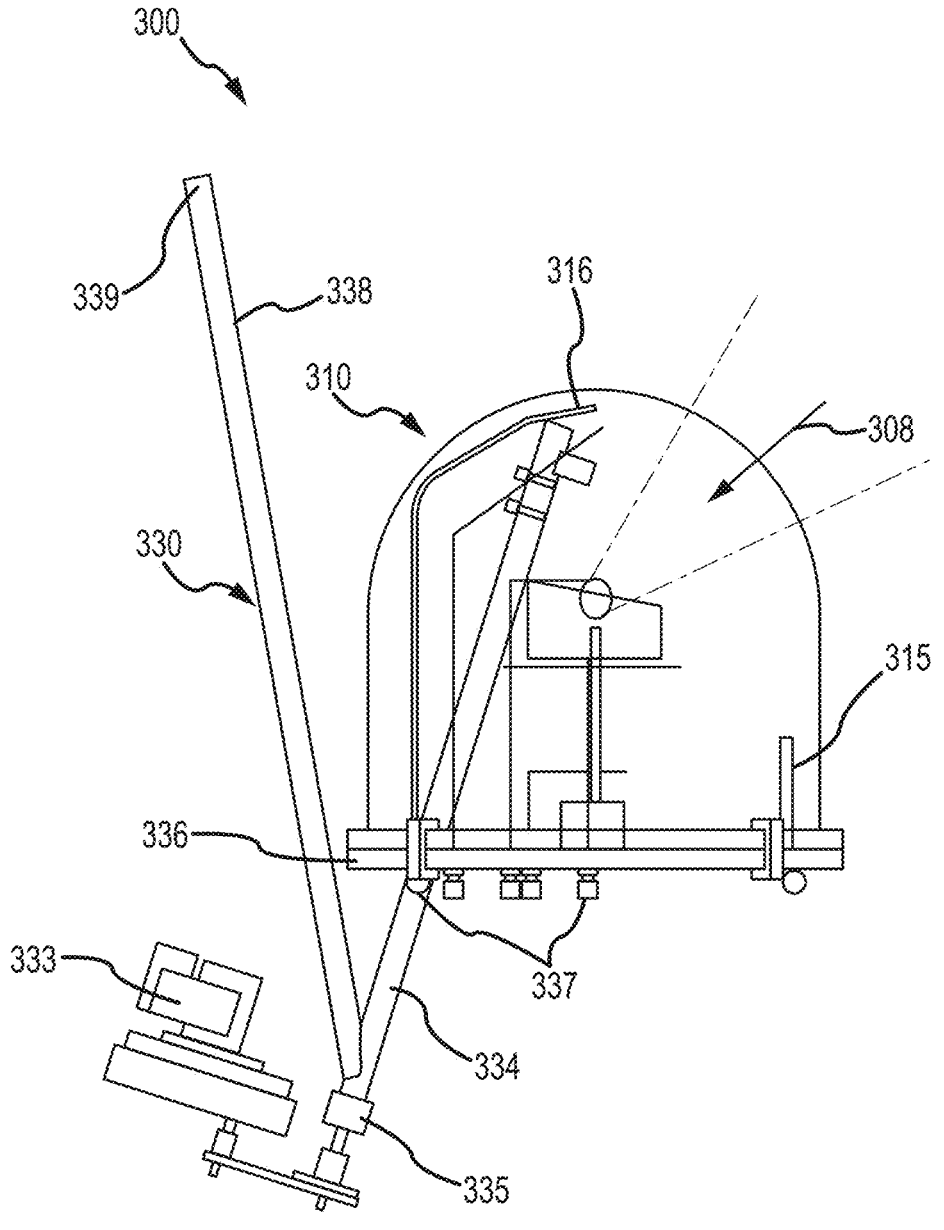
FIG. 3A is a side view representation of yet another embodiment of a solar concentrator reactor system.
Figure 3B:
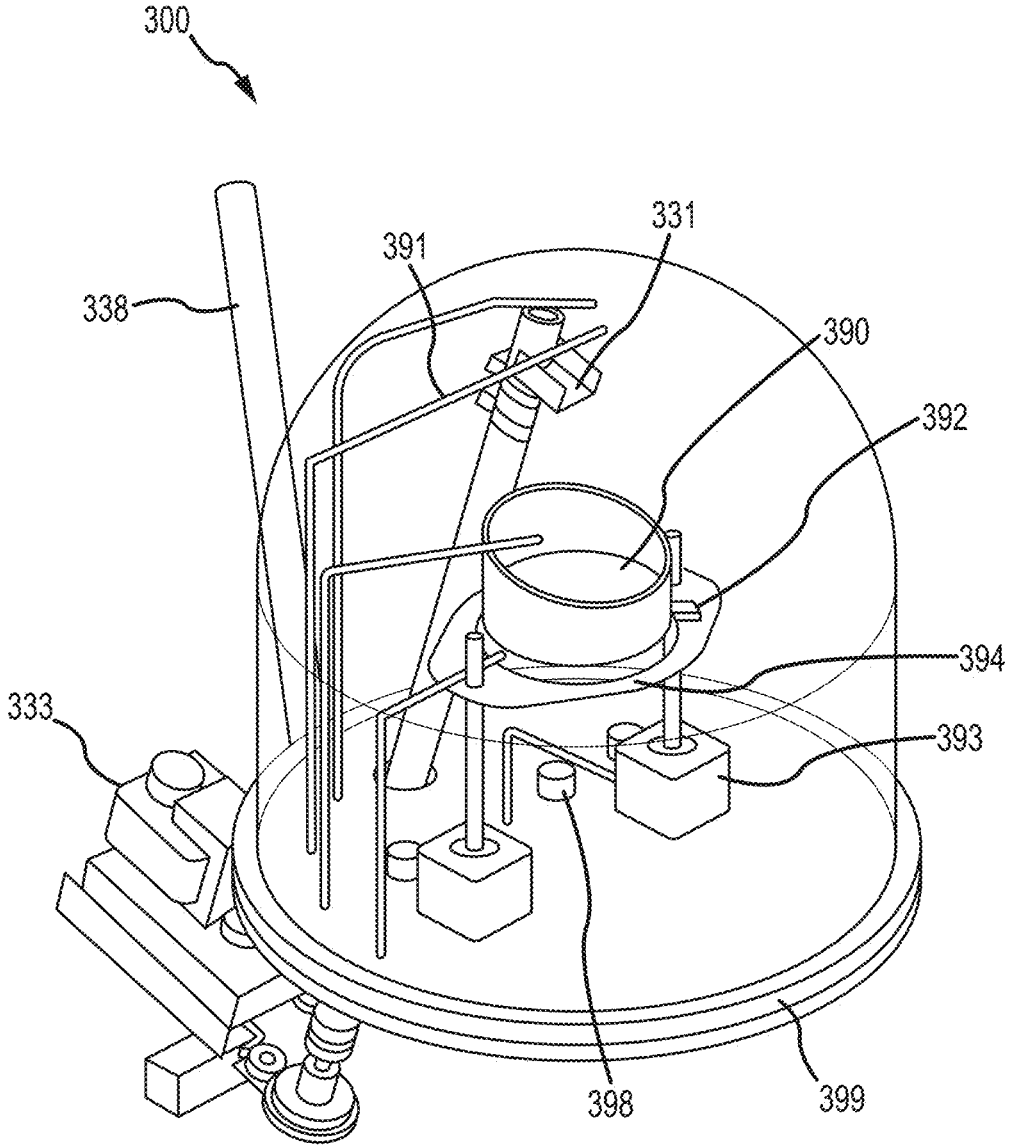
FIG. 3B is a perspective view representation of the solar concentrator reactor system of FIG. 3A.

The solar concentrator reactor system 300, 400 prototype embodiment was designed around a Commercial Off-the-Shelf (COTS) 305 mm diameter, 305 mm tall, flanged Pyrex bell jar as depicted in FIGS. 3A-B. In the interest of cost, a Pyrex jar was used (~820° C. softening point) with adequate air flow externally to prevent overheating and failure. Early testing with the bell jar verified that the concentrated sunlight passing through the bell jar was not enough to overheat and damage the clear reactor shell while still reaching regolith melting temperatures at the focal point inside the bell jar. The reactor base plate is made of 9.5 mm thick stainless steel plate with a high temperature gasket 399 to maintain a seal between the bell jar and the base.

The system 300, 400 was designed to operate at a partial vacuum (~¼ atmosphere) in order to best replicate the lunar conditions with up to a 5 psi differential between the reactor 310, 410 pressure and the vacuum of space. Operating at a partial vacuum also facilitates control of the reaction for characterization by starting with minimal carrier or reactant gas in the reactor and increasing the gas density (via pressure) as needed to promote O2 extraction without overfilling the volume. It was also determined that only components in the immediate proximity of the molten regolith and product gases need to be made from stainless steel to avoid melting and byproduct gases. This includes gas tubes and fittings 337 within the reactor and up to the heat exchanger, and the regolith tray 390.

The particle feed 330 comprises a hopper 338 with hopper inlet 339, and an auger 334 with auger motor 333 and auger nozzle 331. The auger 334 feed is made from a custom 12.7 mm diameter, servo-controlled auger with a custom steel tube housing and straight-tube vertical hopper that is sealed from atmosphere, enabling long duration testing (>1 hr) without refilling. The auger 334 interfaces with the base plate via a custom flange 336 connection while gas ports, thermocouples 391, and electrical feedthroughs 398 interface with it using National Pipe Tapered (NPT) threads to hold a seal. An O-ring shaft seal 335 couples the hopper 338 and the auger 334. The polyethylene tubing and brass tube fittings are used outside of the reactor and downstream of the heat exchanger wherever possible for interfacing with sensors and control valves. In one embodiment, as briefly described above, the solar concentrator reactor system may comprise a sealed particle inlet system of an open bin with a vertical chute into the chamber with the chute packed with particles to form a partial pressure seal and prevent the leakage of gases into or out of the reactor chamber. Stated another way, such an external vertical chute may produce a packed chute particle stream that forms at least a partial pressure seal with the enclosed vessel volume as the packed chute particle stream enters the enclosed vessel volume, the packed chute particle stream then forming the particle stream.

A mass measurement system was implemented using four thin beam load cells 392 to monitor the mass of the regolith tray 390 throughout testing as regolith is fed into the tray 390 and the reaction takes place. The mass measurement system has a maximum load capacity of 900 g and a minimum measurement resolution of 0.5 g. Also, a height adjustment system was implemented for dynamically controlling the height of the regolith tray 390 using two high temperature stepper motors 393 and a vertical translation plate 394 during long duration tests. The high temperature stepper motors 393 actuate to move the vertical translation plate 394, thereby allowing precise positioning of the regolith tray 390. This was added to the design, e.g., to account for the regolith build up within the tray 390 since the molten slag was not extruded from the reactor 310 in this embodiment.

Additional reactor design features presented in FIGS. 3A-B include positioning the gas outlet 316 directly above the reaction zone to pull out product gases as they are produced and positioning four thermocouples 391 within the reactor 310 to monitor product gas temperature, temperature near the regolith tray and load cells, temperature near the stepper motors and reactor base, and temperature near the reactor shell surface. These thermocouple positions are adjustable and may be repositioned in different tests to get an understanding of the internal reactor temperature distributions to optimize reactor design and monitor sensitive components during long duration tests to prevent component failure. Gas inlet 315 is shown at a lower portion of the enclosed volume of the reactor 310.

In one embodiment, the disclosed solar concentrator reactor system comprises a gas flow system including a particle filter, and/or a heat exchanger to bring down the outlet gas temperature before it reaches sensitive sensors. A vacuum pump and vacuum regulator enable the reaction to take place at a prescribed partial vacuum pressure, a gas bleed on the vacuum regulator enables dilution of the exhaust stream with inert gas (for tests utilizing flammable reactant gases), numerous pressure gauges and needle valves enable dynamic tuning of the process flow, additional temperature sensors monitor reactor and gas line temperatures, a flame arrestor on the gas feed prevents flashback when testing with flammable reactant gases, an inline check valve set to a 15 psi differential allows the gas feed to be set above atmospheric pressure while the reactor chamber operates below atmospheric pressure, and a condensation trap downstream of the heat exchanger collects and measures the amount of water produced when using $H_2$ as the reactant gas (water generation provides a direct measure of the amount of $O_2$ produced in the reactor).

For process characterization and optimization, the solar concentrator reactor system 300, 400 prototype embodiment is outfitted with several temperature sensors. An IR temperature sensor may be used to monitor and control the overall process temperature. Alternately or additionally, a pyrometer may be used. Note that temperature control is not important for vapor phase pyrolysis, where the maximum amount of energy and the hottest temperatures achievable are desired. For this reason, operations of the prototype have focused on direct oxygen extraction with inert gas (pyrolysis) and hydrogen (hydrogen reduction) feed gases. (In one embodiment, the inert gas is argon gas.).

In another embodiment, used, for example, for testing the carbothermal reduction process (using methane feed gas), a thermocouple is positioned as close to the reaction zone as possible to monitor and control temperature and different shutter positions to explore the effect of energy input on the production of carbon monoxide. A mass flow meter may be used on the gas flow inlet and the gas flow outlet to measure the mass of gas vaporized through the reduction processes, an 02 sensor and a CO sensor are also implemented on the gas flow outlet to sample product gases being produced. Reactor pressure may be recorded with a pressure transducer to document when vaporization occurs and ensure excessive pressures are not reached. Pressure relief valves and rupture discs may be used as redundant safety measures to avoid dangerous pressurization of the system. Total mass of the regolith tray may also be monitored throughout each test as a secondary method for measuring mass loss through vaporization.

Figure 5:
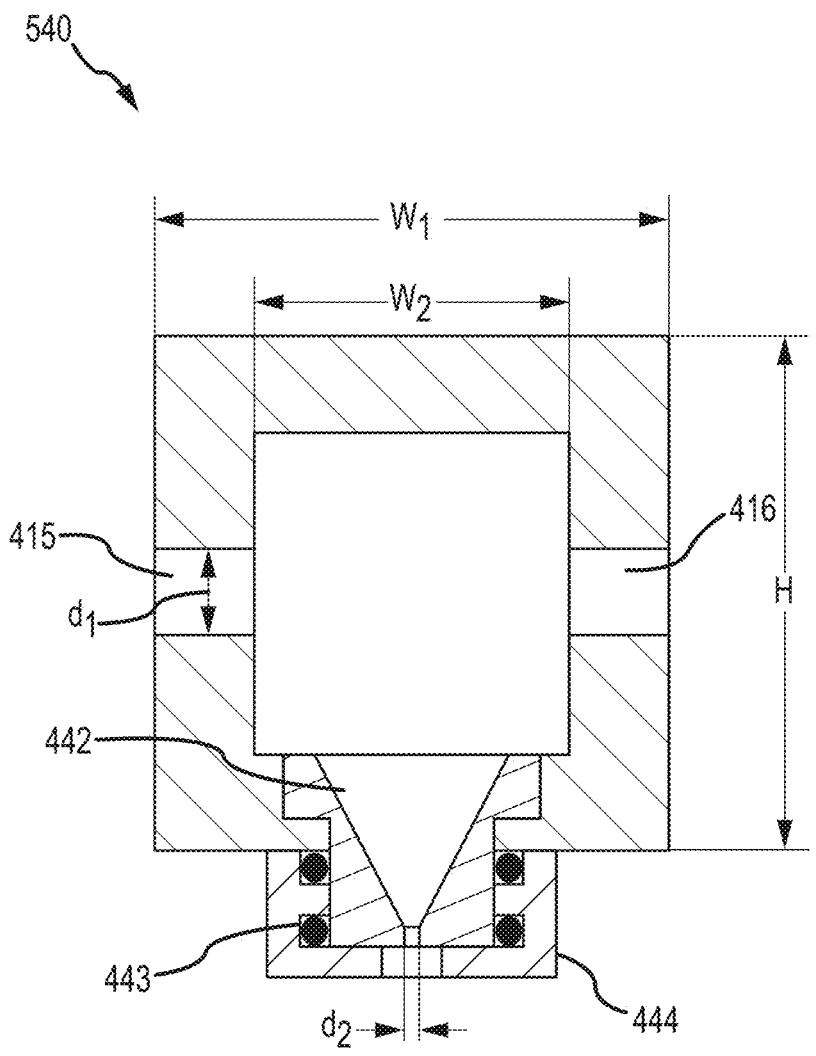
FIG. 5 is a representation of one embodiment of a slag processor element of a solar concentrator reactor system.

With attention to FIG. 5, one embodiment of a slag processor 540 aka slag extrusion system is presented. FIG. 5 is a scaled drawing. The gas inlet 415 may be connected to an inert gas supply with a regulator valve to control the pressure and the gas outlet 416 may be fitted with a pressure transducer and a valve to vent the volume after each test. The enclosure is made from 50 mm×50 mm×9.5 mm thick carbon steel plates welded together. The extrusion nozzle 442 may be machined out of graphite or other refractory material and mated to the bottom plate with alumina paste. A sheath 444 may be made from kiln insulation material that houses a nichrome wire 443 for heating the nozzle 442 up to the regolith melting temperature (1,100° C.). The nozzle 442 is first bored with a small orifice diameter (1.5 mm) for the first round of testing, then increased incrementally depending on the results to the first tests (ability to extrude molten slag with internal pressures between 0-5 psig). Several nozzles may be made with various orifice diameters in various embodiments. For testing, the nozzle 442 may be filled with regolith simulant, heated up to molten temperature, then the pressure may be slowly increased from 0 psig until the molten regolith starts to flow out of the bottom nozzle exit. The extrusion produced may be assessed and the pressure noted.

In the embodiment of a slag processor 540 with slag extrusion nozzle 442, the major slag processor width is $W_1$ of 2.00 in., minor width $W_2$ of 1.25 in, and major height H of 2.00 in. Exit diameter below the nozzle 442 is of diameter $d_2$ of 0.06 in. Gas inlet 415 and gas outlet 416 share a common diameter $d_1$ of 0.33 in and are fitted with a ⅛ in NPT thread.

Experimental Results

Experimental Results using the solar concentrator reactor system 300, 400 prototype embodiment were obtained.

Initial experiments were performed ad hoc with a 0.86 m² Fresnel lens to explore melt characteristics of three different lunar regolith simulants (JSC-1A, JSC-1A-VF, and LHS-1). When measuring melt times, it was determined that both JSC-1A simulants start to melt within 100 ms while LHS-1 takes at least 3 seconds in the irradiating location to melt. The longer residence time of LHS-1 is due to larger and more optically reflective particles composing the LHS-1 regolith simulant, making the material less suited for a falling particle reactor in which particles are heated to a molten state in flight. After the ad-hoc tests, a series of drop tube tests and continuous feed tests were performed with the 0.86 m² lens and then repeated with a new 1.47 m² Fresnel lens purchased specifically for this project. This new lens extends past the SCUs shutter system. In order for the shutter system to be used for controlling the power output from 0-100%, the sides were covered to produce an effective lens area of 1.1 m² for all future testing. This lens is referred to as the 1.1 m² lens throughout this disclosure. This lens is much more powerful and efficient than the 0.86 m² Fresnel lens.

For the drop tube tests, a small amount of lunar regolith simulant was sprinkled into an aluminum drop tube while CSE shines through a hole in the tube. The simulant is then collected from the bottom of the tube and examined under microscope to see if melting occurred. The goal of these tests was to see if it is possible to melt regolith particles in the small residence time it takes for a particle to pass through the concentrated spot (residence time calculated as 0.012s on Earth).

Using JSC-1A with both lenses under similar ambient conditions (800-900 W/m² ambient irradiance) was documented. It was found that some melting occurs using the 0.86 m² lens as evidenced by the shiny and smooth sides of the particles after passing through the CSE spot, but the melting is superficial to the particles since they retain an angular shape. With the 1.1 m² lens, the resultant particles are spherical indicating that they become completely molten and bead due to surface tension in a molten state. This observation demonstrates preliminary concept feasibility without measuring an $O_2$ production rate and bodes very well for the full-blown reactor experiments planned in the second half of the project.

Extensive testing was also performed with different regolith feed mechanisms and simulant types in order to produce a consistent and controllable particle flow rate into the solar concentrator reactor system prototype embodiment. The primary issue for all feed methods is consistency at low mass flow rates. Overhead hopper feeder and vibration feeder designs have reactor integration issues as well. For this reason, an auger feed system was developed.

Three different COTS augers were tested. A 44.5 mm diameter auger ended up being too big, requiring 0.1 RPM to approximate 50 g/hr and was extremely inconsistent. A 12.7 mm auger drill was tested but does not move regolith up the auger shaft because the blade angle is too steep. A 12.7 mm ship auger was tested and showed promise but has intermittent flow due to large blade thickness. For this reason, a custom auger blade was built using the blade angle of the ship auger with thin blades. This auger proved to work well and so was incorporated into the final auger design for the reactor.

In one embodiment, the auger (or other particle delivery device) operates with a variable rotation speed to provide a more consistent and/or robust particle feed. For example, auger speed may vary as a function of where the particles reside on the auger relative to the auger rotation.

FIG. 6 provides a method of use 600 of the solar concentrator reactor systems described above, such as the embodiment of the solar concentrator reactor system 100 of FIG. 1, the system 200 of FIG. 2, the system 300 of FIGS. 3A-B, and the system 400 of FIG. 4. Note that some steps of the method 600 may be added, deleted, and/or combined. For example, the steps involving supply and emitting of gases (steps 612 and 628, respectively) may be deleted in some embodiments, and a step of controlling a rate of extruded molten reactive material may be added. The steps are notionally followed in increasing numerical sequence, although, in some embodiments, some steps may be omitted, some steps added, and the steps may follow other than increasing numerical order. Any of the steps, functions, and operations discussed herein can be performed continuously and automatically. The method starts at step 604 and ends at step 640.

After starting at step 604, the method 600 proceeds to step 608. At step 608, a solar concentrator reactor system is provided. The solar concentrator reactor system may be any of the embodiments described above or combinations thereof. After completing step 608, the method 600 proceeds to step 612.

At step 612, a first gas stream is provided to the enclosed vessel volume of the solar concentrator reactor system. The first gas stream comprises a first gas. The first gas flows within the enclosed vessel volume, to include at or adjacent the defined irradiating location. After completing step 612, the method 600 proceeds to step 616.

At step 616, a set of particles of a particle stream are delivered to the defined irradiating location within the enclose vessel volume. The particle stream may be produced with aid of an auger as described above. The particle stream may be of any of several shapes or configurations, to include a cylindrically shaped stream and a planer shaped curtain (see, e.g., FIGS. 7A-C). The shape of the particle stream may be controlled by a controller and/or by mechanical or geometrical ways (e.g., by way of an auger nozzle 331, and shown in FIG. 3B).After completing step 616, the method 600 proceeds to step 620.

At step 620, solar energy is directed to the defined irradiating location by way of the solar concentrator. After completing step 620, the method 600 proceeds to step 624.

At step 624, the set of particles are irradiated at the defined irradiating location by way of concentrated solar energy as enabled or produced or directed by the solar concentrator. The defined irradiating location may be a selectable location. The defined irradiating location may be a set of defined irradiating locations, such as locations between the particle feed outlet of the particle feed and the slag processor (stated another way, locations as the particles fall within the enclosed volume of the reactor), or at or adjacent a slag processor. A controller may be used to establish the irradiating location or set of irradiating locations. The defined irradiating location may form or be directed to a molten reacted material pool at or adjacent the slag processor, or at a distal or lower or bottom portion of the enclosed volume. The irradiation of the set of particles produces a thermochemical reaction involving the set of particles and the first gas. After completing step 624, the method 600 proceeds to step 628.

At step 628, the second gas, as yielded or produced by way of the thermochemical reaction, is emitted from gas outlet of the solar concentrator reactor system. After completing step 628, the method 600 proceeds to step 632.

At step 632, molten reacted material, as yielded or produced by way of the thermochemical reaction, is extruded from the solar concentrator reactor system by way of the extrusion nozzle. As described above, a controller may control the extrusion rate at a selectable extrusion rate by control of, for example, one or more of the enclosed vessel volume pressure and the nozzle temperature. After completing step 632, the method 600 proceeds to step 636.

At step 636, a query is made as to whether operations of the solar concentrator reactor system are to continue. If the reply or response is NO, the method 600 proceeds to step 640 and the method ends. If the reply or response is YES, the method 600 proceeds to step 612.

Figures 7A, 7B, 7C:
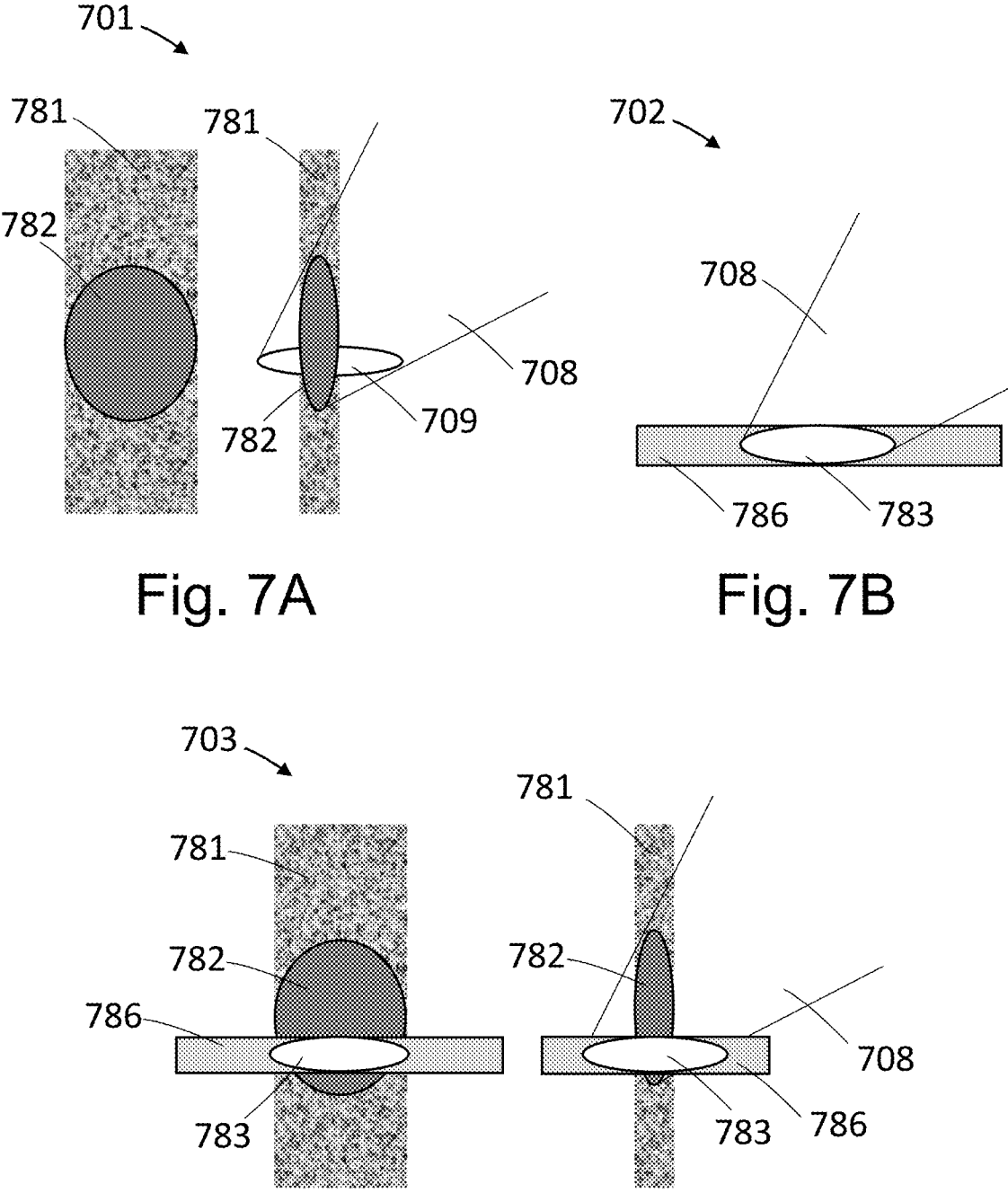
FIG. 7A is a representation of a falling particle curtain configuration to irradiate particles in a solar concentrator reactor system.
FIG. 7B is a representation of a melt pool configuration to irradiate particles in a solar concentrator reactor system.
FIG. 7C is a representation of a regolith curtain plus melt pool configuration to irradiate particles and molten pool in a solar concentrator reactor system.

With attention to FIGS. 7A-7C, a set of three representations of configurations to irradiate particles in a solar concentrator reactor system (such as those described above) are provided. The incoming concentrated light cone may be configured or adjusted, for example, such that any light that passes through the particle stream of falling particles is then used to heat up the molten pool to retain the reaction temperatures for the molten pool. More specifically, the angles of concentrated light may be configured such that concentrated light which is neither absorbed nor reflected from the particles passes through the falling particle sheet to then be absorbed by the molten pool, thereby heating the molten pool. Internally reflective surfaces may be included within the reactor to further increase efficiency by redirecting radiated light emitted by the particles and/or molten pool and any concentrated light not absorbed by particles or pool to be reflected back onto the particles and/or molten pool.

The series of three configurations 701, 702, and 703 provide differing methods of operating the solar concentrator reactor system with respect to irradiation of the set of particles of the particle stream and the associated pool of melted or molten reactive material. As described above, the solar concentrator and its associated light cone may be controlled by a controller, such as controller 150 of FIG. 1.

Although FIGS. 7A and 7C are illustrated with respect to a curtain or sheet of regolith, any type, or set of falling particles may be employed. Also, the falling particles may be presented or delivered in other than a vertical orientation. For example, the particles may be fed through the light cone in a non-vertical orientation as in the case of a fluidized bed, pneumatically conveyed particles, or by a chute, vibratory feeder, or other mechanism causing momentum change to optimize particle flight path and the residence time in the light cone.

Configuration 701 of FIG. 7A is a particle curtain configuration. A front and a corresponding side view of the configuration are depicted. The curtain 781 is irradiated at a location 782 defined by the optical ellipses of each of the paired views, the optical ellipses 782 illustrating the intersection of the concentrated light cone 708, 709 provided by the solar concentrator with the regolith curtain 781. The location of irradiation is at some medial or other point between the particle feed insertion point and the slag processor (see FIG. 1).

Configuration 702 is a melt pool configuration. A side perspective view of the configuration is depicted. The melt pool 783, positioned at or adjacent the slag processor 140 of FIG. 1, is irradiated by the light cone 708 of the solar concentrator. Note that the delivery or flow of particles to the melt pool is not depicted—any of several methods of delivery of the particles are possible, to include a sheet of particles, a cylindrical stream of particles, etc.

Configuration 703 is a particle curtain plus melt pool configuration. A front and a corresponding side perspective view of the configuration are depicted. The particle curtain 781 is irradiated at locations 782 and 783 defined by the optical ellipse (or CSE projection) of the front view, the optical ellipses illustrating the intersection of the concentrated light cone 708 provided by the solar concentrator with each of the particle curtain 781 and with the melt pool 783. The location of irradiation is at the melt pool and on the particle curtain at a lower or distal portion of the particle curtain.

As mentioned above, the solar concentrator reactor system of the disclosure may be integrated with a prior art carbothermal regolith reduction system (of Gustafson, for example, as cited above), In such an integrated system, a gas handling subsystem for the solar concentrator reactor system may control flow into and out of the reactor and interface with secondary $O_2$ extraction processing equipment already developed and demonstrated, enabling efforts to focus on rapidly developing the falling particle receiver and optimizing its performance. The solar concentrator reactor system is thus integrated into a carbothermal reduction process utilizing the secondary processing stages of, for example, Gustafson.

For gas flow inside the reactor, the key features include the position of the inlet and outlet for creating a gas curtain in front of the reactor window to prevent fouling, controlling the gas flow path such that particle residence times can be manipulated without causing turbulent flow within the reactor, and having rapid response pressure relief through the outlet to maintain a constant pressure within the reactor as different materials in the regolith vaporize. Preventing window fouling is critical for CSE to work as the energy source and pressure control is critical for continuous processing and slag extrusion.

In such an integrated system or in the above described solar concentrator reactor systems, the inlet gas flow may come from other processing modules in some embodiments in order to minimize the need for external resources aside from regolith. A pressure regulator may be used to limit the flow and pressure of the inlet gas stream. The outlet flows may be controlled by an adjustable pressure relief valve on the reactor gas outlet that is sensitive enough to detect and respond to small increases in pressure. As materials vaporize, the reactor pressure will rise beyond the set pressure of the outlet regulator and induce a higher flow rate out of the regulator in order to maintain the set pressure. The combination of the inlet pressure regulator and outlet pressure relief valve may give high fidelity control over both the flow rate and chamber pressure, enabling process characterization testing and optimization.

Note that a challenge for the disclosed solar concentrator reactor system may be heat dissipation through the bed of the reactor. If not controlled, the heat produced in the reactor could damage surrounding components. The low thermal conductivity of lunar regolith and lunar regolith simulant will aid in the design of the reactor by dramatically reducing conductive heat transfer from the pool of molten regolith. The size of the reactor will affect the maximum temperature of the reactor components and a sufficiently large reactor typically may not require active cooling (although some instrumentation, such as load cells, within the reactor may need active cooling). However, if active cooling is required, then this may be achieved by introducing channels for fluid flow through the reactor base. Reflective internal surfaces within the reactor might also be an effective method to reduce radiative heat transfer to the walls of the system while enhancing optical absorption by the falling particles. Reflective surfaces will be implanted as needed and the internal and external reactor temperatures characterized.

Note that other methods of use of the disclosed solar concentrator reactor system are possible. Also, any of the steps, functions, and operations discussed herein can be performed continuously and automatically. In some embodiments, one or more of the steps of the method of use may comprise computer control, use of computer processors, and/or some level of automation.

The exemplary systems and methods of this disclosure have been described in relation to systems and methods involving a solar concentrator reactor system and method of use for high temperature thermochemical processes. However, to avoid unnecessarily obscuring the present disclosure, the preceding description omits a number of known structures and devices, and other application and embodiments. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

A number of variations and modifications of the disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A solar concentrator reactor system producing at least a reacted material, the system comprising:
    a solar concentrator reactor comprising:
        an enclosed vessel comprising an upper portion and a lower portion, the lower portion comprising a tray configured to hold a reacted material pool of reacted material;

a gas inlet configured to input a first gas stream to the enclosed vessel volume, the first gas stream comprising a first gas;

a gas outlet configured to output an output gas stream from the enclosed vessel, the output gas stream comprising a second gas;

a solar concentrator comprising a light concentrating system configured to produce a solar energy light profile comprising solar energy converging to a first irradiating location within the enclosed vessel;

a particle feed device configured to deliver a set of falling particles of a particle stream to the first irradiating location, the set of falling particles descending by gravity in a falling particle direction from the upper portion to the lower portion in the direction of gravity, the first irradiating location between the upper portion and the lower portion; and a controller configured to control an incidence angle between the solar energy light profile and the falling particle direction to provide the solar energy to the first irradiating location; wherein:

the controller controls the incidence angle by adjustment of the light concentrating system, the solar energy light profile directly irradiating the set of falling particles to produce a thermochemical reaction of at least the set of falling particles, the thermochemical reaction yielding the second gas and also yielding a reacted material;

the light concentrating system is at least one of: a parabolic mirror, a heliostatic reflector, a lens, and a refractive optic;

the reacted material is extruded from a slag extrusion nozzle of the lower portion; and the output gas stream is emitted from the gas outlet.

2. The solar concentrator reactor system of claim 1, wherein the controller is further configured to control the solar energy light profile to simultaneously irradiate the reacted material pool held by the tray and irradiate the set of falling particles.

3. The solar concentrator reactor system of claim 1, wherein the falling particles are falling regolith particles.

4. The solar concentrator reactor system of claim 1, further comprising a measurement system comprising one or more load cells configured to measure a mass of the tray.

5. The solar concentrator reactor system of claim 1, wherein the controller is further configured to control a processing temperature of the thermochemical reaction using at least a temperature sensor positioned within the enclosed vessel.

6. The solar concentrator reactor system of claim 1, wherein the second gas is at least one of oxygen, carbon dioxide, carbon monoxide, and $H_2O$.

7. The solar concentrator reactor system of claim 1, further comprising an external vertical chute, the external vertical chute producing a packed chute particle stream forming at least a partial pressure seal with the enclosed vessel and preventing gas leakage into or out of the enclosed vessel as the packed chute particle stream enters the enclosed vessel, the packed chute particle stream then forming the particle stream.

8. The solar concentrator reactor system of claim 1, wherein the controller is further configured to control a rate of extrusion of the reacted material from the slag extrusion nozzle by control of one or more of an enclosed vessel pressure, a slag extrusion nozzle temperature, and a particle feed rate of the particle stream.

9. The solar concentrator reactor system of claim 1, wherein the particle stream is a particle stream sheet.

10. A solar concentrator reactor system producing a reacted material, the system comprising:

a solar concentrator reactor comprising:

an enclosed vessel having an upper portion and a lower portion, the lower portion comprising a tray configured to hold a reacted material pool of reacted material;

a solar concentrator comprising a light concentrating system configured to produce a solar energy light profile comprising solar energy converging to an irradiating location within the enclosed vessel;

a particle feed device configured to deliver a set of falling particles of a particle stream to the irradiating location, the set of falling particles descending by gravity in a falling particle direction from the upper portion to the lower portion in the direction of gravity, the first irradiating location between the upper portion and the lower portion; and a controller configured to control an incidence angle between the solar energy light profile and the falling particle direction to provide the solar energy to the irradiating location;

wherein:

the controller controls the incidence angle, by control of the light concentrating system, to directly irradiate the set of falling particles of the particle stream to produce a thermochemical reaction of at least the set of falling particles and yield a reacted material;

the light concentrating system is at least one of: a parabolic mirror, a heliostatic reflector, a lens, and a refractive optic;

the reacted material is extruded from the lower portion at a selectable extrusion rate; and the selectable extrusion rate is controlled by the controller by control of one or more of the enclosed vessel pressure, a nozzle orifice size, and the nozzle temperature.

11. The system of claim 10, wherein the controller is further configured to control the solar energy light profile to simultaneously irradiate the reacted material pool held by the tray and irradiate the set of falling particles.

12. The system of claim 11, wherein the falling particles are falling regolith particles.

13. The system of claim 10, further comprising:

a gas inlet configured to input a first gas stream to the enclosed vessel, the first gas stream comprising a first gas;

a gas outlet configured to output a second gas stream from the enclosed vessel, the second gas stream comprising a second gas;

a heat transfer device coupled to a slag extrusion nozzle configured to control a temperature of the reacted material; and an external vertical chute, the external vertical chute producing a packed chute particle stream forming at least a partial pressure seal with the enclosed vessel and preventing gas leakage into or out of the enclosed vessel as the packed chute particle stream enters the enclosed vessel, the packed chute particle stream then forming the particle stream;

wherein the thermochemical reaction further produces the second gas.

14. The system of claim 13, wherein the second gas is at least one of oxygen, carbon dioxide, carbon monoxide, and $H_2O$.

15. A solar concentrator reactor system producing a reacted material and an output gas, the system comprising:

an enclosed vessel having an upper portion and a lower portion, the lower portion comprising a tray configured to hold a reacted material pool of reacted material;

a gas inlet configured to input an input gas stream to the enclosed vessel;

a gas outlet configured to output an output gas stream comprising the output gas from the enclosed vessel;

a solar concentrator comprising a light concentrating system configured to produce a concentrated light comprising solar energy to an irradiating location within the enclosed vessel;

a particle feed device configured to deliver a set of falling particles of a particle stream to the irradiating location, the set of falling particles descending by gravity in a falling particle direction from the upper portion to the lower portion in the direction of gravity, the first irradiating location between the upper portion and the lower portion; and a controller configured to control an incidence angle between the concentrated light and the falling particle direction to provide solar energy to the irradiating location;

wherein:

the controller controls the light concentrating system to control the incidence angle to directly irradiate the set of falling particles to produce a thermochemical reaction of at least the set of falling particles, the thermochemical reaction yielding a reacted material and the output gas;

the reacted material is extruded from the enclosed vessel; and the output gas stream is output from the gas outlet.

16. The system of claim 15, further comprising an external vertical chute producing a packed chute particle stream forming at least a partial pressure seal with the enclosed vessel and preventing gas leakage into or out of the enclosed vessel as the packed chute particle stream enters the enclosed vessel, the packed chute particle stream forming the particle stream.

17. The system of claim 15, wherein the output gas is at least one of oxygen, carbon dioxide, carbon monoxide, and $H_2O$.

18. The system of claim 15, wherein the controller is further configured to control the solar energy light profile to simultaneously irradiate the reacted material pool held by the tray and irradiate the set of falling particles.

19. The system of claim 16, wherein the controller further operates to control a packed chute particle stream rate of the packed chute particle stream.

20. The system of claim 15, wherein the falling particles are falling regolith particles.

* * * * *